United States Patent
Cerny

(10) Patent No.: US 9,009,167 B2
(45) Date of Patent: Apr. 14, 2015

(54) METHOD AND SYSTEM OF PLANNING AND/OR MANAGING A TRAVEL PLAN

(76) Inventor: Ron Cerny, Herzlia (IL)

(*) Notice: Subject to any disclaimer, the term of this patent is extended or adjusted under 35 U.S.C. 154(b) by 297 days.

(21) Appl. No.: 13/036,036

(22) Filed: Feb. 28, 2011

(65) Prior Publication Data

US 2011/0213787 A1     Sep. 1, 2011

Related U.S. Application Data

(60) Provisional application No. 61/309,008, filed on Mar. 1, 2010.

(51) Int. Cl.
    G06F 17/30    (2006.01)
    G06F 7/00     (2006.01)
    G06Q 10/02    (2012.01)

(52) U.S. Cl.
    CPC .......... *G06F 17/30867* (2013.01); *G06Q 10/02* (2013.01)

(58) Field of Classification Search
    CPC   G06Q 10/0631; G06Q 10/109; G06Q 10/025
    USPC ............................................. 707/749; 705/6
    See application file for complete search history.

(56) References Cited

U.S. PATENT DOCUMENTS

| | | | | |
|---|---|---|---|---|
| 5,948,040 | A  * | 9/1999 | DeLorme et al. | 701/426 |
| 7,239,959 | B2 * | 7/2007 | Rasmussen et al. | 701/537 |
| 8,090,707 | B1 * | 1/2012 | Orttung et al. | 707/710 |
| 8,117,073 | B1 * | 2/2012 | Orttung et al. | 705/26.43 |
| 2005/0096946 | A1 * | 5/2005 | Janakiraman et al. | 705/5 |
| 2007/0168239 | A1 * | 7/2007 | Marcken et al. | 705/6 |
| 2010/0036867 | A1 * | 2/2010 | Mitchell | 707/102 |
| 2010/0057513 | A1 * | 3/2010 | Carlson | 705/8 |
| 2010/0076802 | A1 * | 3/2010 | Bhogal et al. | 705/8 |
| 2010/0094678 | A1 * | 4/2010 | Gupta et al. | 705/9 |

* cited by examiner

*Primary Examiner* — Pavan Mamillapalli

(57) ABSTRACT

A method of planning a trip which comprises receiving a plurality of profile characteristics from a user, automatically selecting a group from a plurality of travel objects according to a match with the profile characteristics where each travel object having a plurality of scheduling characteristics. The method further includes computing an arrangement of members of the group in a schedule according to the plurality of profile characteristics and receiving an update to one or more of members, the schedule, the arrangement and/or the profile characteristics. Now, the arrangement is automatically updated so that one or more of the travel objects are rescheduled according to a relationship between its scheduling characteristics and respective scheduling characteristics of other travel objects in light of the profile characteristics.

28 Claims, 18 Drawing Sheets

FIG. 3

METHOD AND SYSTEM OF PLANNING AND/OR MANAGING A TRAVEL PLAN

RELATED APPLICATION

This application claims the benefit of priority under 35 USC 119(e) of U.S. Provisional Patent Application No. 61/309,008 filed Mar. 1, 2010, the contents of which are incorporated herein by reference in their entirety.

FIELD AND BACKGROUND OF THE INVENTION

The present invention, in some embodiments thereof, relates to planning system and method and, more particularly, but not exclusively, to system and method of planning and managing a travel plan.

During the last years, business, local and international tourism has become one of the most thriving markets. World travel market reached 930 million tourists crossing between nations in 2007, according to the world tourism organization (WTO) reports. This market growth may be reflected by the booming internet tourism activity with more than 250 million unique monthly travel web site visitors.

A travel or a trip is part of an end to end scenario which involves pre travel activities, travel activities, and post travel activities. Pre travel activities include activities such as selecting a destiny and planning travel activities. Travel activities include activities such as commuting, site seeing, dinning, lodging, shopping, and other travelling activities. Post travel activities includes activities such as arranging and developing images and videos, ordering photo album, acquiring value added tax (V.A.T) refunds and the like.

These travel activities are all related to purpose of the trip, to the execution of the trip which may be described as a schedule and route, to travel events that influence them and are tied together to a scenario of context between the combination of activities and between themselves.

For the common traveler, planning travel activities may be performed months before the travel activities and/or few hours or moments before starting the travel activities. OTTI, the U.S.A. government Office of Travel and Tourism, statistics indicate a traveler's planning duration of 100 days average and 60 days median before travel date. On the other hand, some travelers plan on the last minute so as to enjoy last minute travel tariffs and/or low cost deals for weekend vacations and/or urgent unexpected business travels. The invested planning effort moves from weeks to hours depending on trip length and the planning methodology.

Various websites provide travel planning assisting solutions. These websites include solutions for managing corporate travel reservation and expenses such as Rearden Commerce Inc. and getthere.com or itineraries creation sites such as HomeAndAbroad.com, Tripwiser.com, Travelmuse.com, tripit.com and dopplr.com. Typically the provided planning solutions require the user to provide a profile defined by a trip style, a trip theme, a trip characteristics list, a destination and/or travel period. Then the user selects points of interest (POI) and/or services and adds them to the itinerary.

For example, U.S Patent Application No. 2008/0046298 filed on Jan. 29, 2007 methods, systems and computer readable code for travel planning. The system includes a travel planning engine that schedules a plurality of activities within one or more time intervals and generates a travel plan, where each activity is associated with a physical location and optional time parameters. Alternatively or additionally, the travel planning is implemented by receiving manual travel planning directives through a user interface. The activities may be scheduled to satisfy specific constraints and/or travel benefit parameters. The travel plan may include information about traveling between relevant locations. The document further describes a method of comparing and/or presenting a plurality of travel options, wherein each travel option is associated with a respective mode of transportation and a method for customizing a travel itinerary for a traveler.

Another example is described in U.S Patent Application Pub. No. 2007/0143156, filed on Jun. 21, 2007 that describes a method and a website for making travel plans between an originating location and a destination that may be at least partially determined by weather criteria, travel time and cost, and preselected activities that may exist at the destination during the time period in which a trip is to be made.

SUMMARY OF THE INVENTION

According to some embodiments of the present invention there is provided a method of planning a trip that comprises receiving a plurality of profile characteristics from a user, automatically selecting a group from a plurality of travel objects according to a match with the plurality of profile characteristics, each the travel object having a plurality of scheduling characteristics, computing an arrangement of members of the group in a schedule according to the plurality of profile characteristics, receiving an update to at least one of the members, the schedule, the arrangement and the plurality of profile characteristics, and automatically updating the arrangement so that at least one of the travel object being rescheduled according to a relationship between its scheduling characteristics and respective scheduling characteristics of others of the plurality of travel objects in light of the plurality of profile characteristics.

Optionally, the update is an update to the arrangement, the update being received from the user.

Optionally, the updating comprises detecting an execution of one member of the group and automatically adding another of the plurality of travel objects in response to the detection.

Optionally, the automatically selecting comprises adding at least one additional travel object in response to a selection of a travel object having an execution of another the travel object as a suspending condition.

Optionally, at least some of the plurality of profile characteristics are extracted from a user profile of the user.

Optionally, at least some of the plurality of profile characteristics are extracted from a travel profile provided by the user to define at least one of a group consisting of: destination, travel period, origin, attendants, and type.

More optionally, the method further comprises updating the user profile according to the plurality of travel objects.

Optionally, the method further comprises identifying at least one additional user profile associated with a user profile of the user, each one of the additional user profile defined at least one executed travel schedule defining at least one executed travel activity; wherein the automatically selecting comprises automatically selecting the group according to the at least one executed travel activity.

Optionally, the method further comprises receiving a plurality of additional profile characteristics from at least one additional user, the computing comprises computing at least one of the arrangement and the updated arrangement so that each one of the travel object being scheduled according to a relationship between its scheduling characteristics and the plurality of additional profile characteristics.

Optionally, the automatically selecting comprises weighting at least some of the plurality of travel objects according to a user profile of the user and selecting the group according to the weighting.

Optionally, the automatically selecting comprises analyzing the popularity of at least some of the plurality of travel objects in at least one online content source and selecting the group according to the analysis Optionally, the automatically selecting comprises analyzing the plurality of profile characteristics and automatically selecting the group according to the analyzing.

Optionally, the plurality of scheduling characteristics comprise a location of an activity site, the computing comprises computing the arrangement according to a distance between the location and at least one other location of at least one additional activity site defined by at least one of the plurality of other travel objects.

More optionally, the computing comprises computing the arrangement according to a transportation parameter pertaining to a route between the activity site and the at least one additional activity site.

Optionally, the method further comprises displaying the arrangement to a user.

Optionally, the computing comprises receiving at least one user profile of at least one additional user and computing the arrangement according to the at least one user profile.

According to some embodiments of the present invention there is provided a system of managing a travel plan. The system comprises a database hosting a plurality of travel objects, each having a plurality of scheduling characteristics, an input interface which receives a plurality of profile characteristics from a user via a network, and a travel planning manager which automatically selects a group of the plurality of travel objects according to the plurality of profile characteristics and computes an arrangement of members of the group in a schedule according to the plurality of profile characteristics. The travel planning manager receives an update to at least one of the members, the schedule, the arrangement and the plurality of profile characteristics and automatically updating the arrangement so that at least one of the travel object being rescheduled according to a relationship between its scheduling characteristics and respective scheduling characteristics of others of the plurality of travel objects, in light of the plurality of profile characteristics.

Optionally, the system further comprises a reservation module which communicates with at least one network node connected to the network to reserve automatically at least one service according to the arrangement.

Optionally, the system further comprises a data analysis module which scores at least some of the plurality of travel objects according to a content published by at least one network node connected to the network.

Optionally, the system further comprises a similarity module which scores at least some of the plurality of travel objects according to a similarity to at least one travel object, previously selected by the user, of the plurality of travel objects.

Optionally, the system further comprises a location sensitive module which identifies a location of the user; the travel planning manager updates the arrangement according to the location.

Optionally, the system further comprises an updating module which calculates the update by monitoring at least one network node connected to the network.

More optionally, the updating module monitors an addition of at least one new travel object to the database and calculates the update accordingly.

More optionally, the updating module monitors at least one network node connected to the network to detect a change to at least one of the plurality of travel objects, the updating module updating the at least one travel object according to the change.

According to some embodiments of the present invention there is provided a computer program product, comprising a computer usable medium having a computer readable program code embodied therein, the computer readable program code adapted to be executed to implement a method of planning a trip. The method comprises receiving a plurality of profile characteristics from a user, automatically selecting a group from a plurality of travel objects according to a match with the plurality of profile characteristics, each one of the travel object having a plurality of scheduling characteristics, computing an arrangement of members of the group in a schedule according to the plurality of profile characteristics, receiving an update to at least one of the members, the schedule, the arrangement and the plurality of profile characteristics, and automatically updating the arrangement so that at least one of the travel object being rescheduled according to a relationship between its scheduling characteristics and respective scheduling characteristics of others of the plurality of travel objects in light of the plurality of profile characteristics.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse or touch screen are optionally provided as well.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIG. 3 is an exemplary GUI, such as a webpage, for allowing the user to enter travel profile data, according to some embodiments of the present invention;

DESCRIPTION OF EMBODIMENTS OF THE INVENTION

Figure 1:
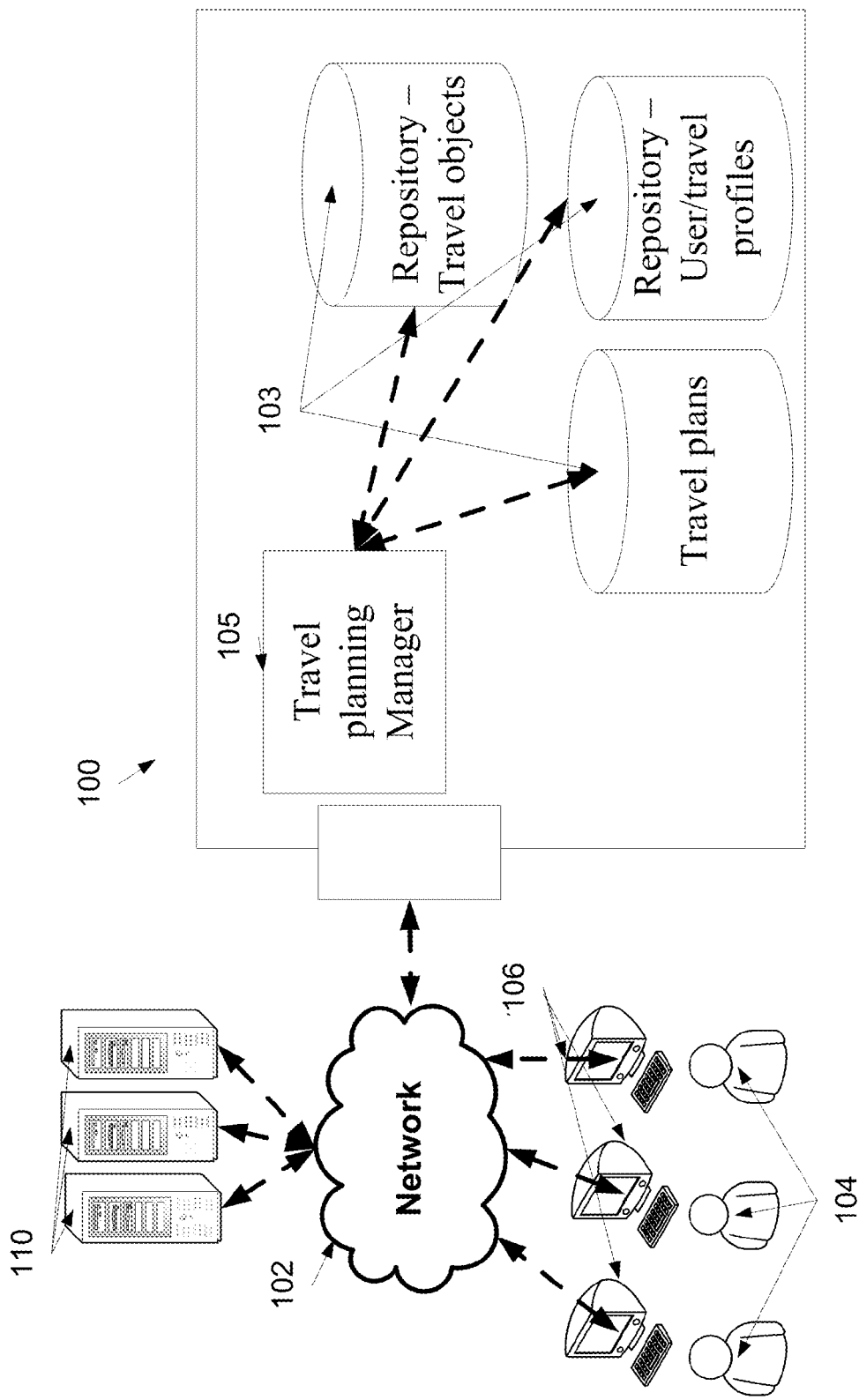
FIG. 1 is a schematic illustration of a system of generating and optionally managing a personalized travel plan according to inputs of a remote user, according to some embodiments of the present invention.

The present invention, in some embodiments thereof, relates to planning system and method and, more particularly, but not exclusively, to system and method of planning and managing a travel plan.

According to an aspect of some embodiments of the present invention there is provided a system and a method of planning a trip. The method is based on a database that hosts a plurality of travel objects, each having a plurality of scheduling characteristics, such as time, location, cost and the like, that allows arranging them automatically in a schedule that is physically possible to one or more travelers. Optionally, the database hosts user and travel profiles which include profile characteristics, such as user characteristics, user preferences, budget and travel period. The user and/or travel profiles are optionally received from the user, for example via client device, such as a laptop, a personal computer, a thin client, a tablet, a PDA and a mobile phone. The method further includes automatically selecting a group of the plurality of travel objects according to the profile characteristics. Now, an arrangement of members of the selected group in a schedule is computed according to the profile characteristics and travel context. The arrangement is computed so that each one of the travel objects is scheduled according to a relationship between its scheduling characteristics and respective scheduling characteristics of others of the travel objects, in light of the profile characteristics. When a change to the members of the group, the arrangement and/or the profile characteristics is received, for example from the user and/or an updating module that monitors one or more network nodes, an update to the arrangement is computed so that the selected travel objects are rescheduled according to the relationship in light of the plurality of profile characteristics.

Optionally, the system and the method allows scheduling and updating the scheduling of pre travel activities, such as reservation and visas, travel activities, such as site seeing and concerts, and/or post travel activities such as photo album creation and/or ordering before and/or during a travel period. In such a manner, a traveler may have a concurrent and up-to-date travel plan that is dynamically adjusted according to real time changes and/or updates.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Reference is now made to FIG. 1, which is a schematic illustration of a system 100 of generating, and optionally managing, a personalized travel plan according to inputs of remote users 104, according to some embodiments of the present invention. The system 100, which is optionally implemented on one or more servers, which are connected to a computer network 102, such as the Internet, is connected to one or more repositories 103 that host a plurality of records, each describes a travel related activity, such as a pre-travel activity, a travel activity, and a post-travel activity. These records may be referred to herein as travel objects. The repository may be directly connected to the system 100 or remote, as shown at 110.

The system 100 further includes a travel planning manager 105 that is designed to generate a travel schedule, for example as described below. The travel schedule may be stored at one or more repositories, such as 103 and/or forwarded to a remote client device 106 that displays the travel schedule to the user 104. As used herein a client user device 106 means a personal computer, a laptop, a mobile device, for example mobile phone and/or a personal digital assistant (PDA), and/or any device that is designed to be connected to the network 102 or include the system 100 and be operated by the user 104.

In use, the user 104 uses the client device 106 for viewing and/or using the system 100 for planning, viewing and/or managing the travel schedule, for example as described hereinbelow and outline above.

Figure 2:
FIG. 2 is an exemplary graphical user interface (GUI), such as a webpage for user profile entry, according to some embodiments of the present invention.

Optionally, the client user device 106 allows a user to create and/or update a user profile. For example, FIG. 2 depicts an exemplary graphical user interface (GUI), such as a webpage for user profile entry. The user profile, which is optionally stored at the one or more repositories 103, includes data that may be used for generating and/or managing the travel schedule, for example as described below. The user profile includes a plurality of user characteristics. The user characteristics may include any personal information for example one or more of the following:
1. Age—the age of the traveler.
2. Gender—the gender of the traveler.
3. Religion—the religious identity of the traveler.
4. Martial status—the martial status of the traveler.
5. User preferences—what are the traveling preferences of the traveler. For example regions of interest, hobbies, travel characteristics such as accommodation and transportation and the like. The preferences may be selected or uploaded by the user and/or automatically identified by analyzing previous travel schedules of the past trips of the user and/or analyzing other user related data, such as web-surfing data, questionnaires, preferences of social network friends, and/or analysis of personal data, such as geographic location, age, marital status, religion, gender, profession, medical condition, and the like.
6. Medical status—the medical status and/or limitations of the traveler.
7. Driver license—whether the traveler has a driver license or not and optionally in which countries.
8. Friends—a list of friends, for example entities which are identified as friends in a social network, such as Facebook™, Linkedin™, and the like and/or links to such lists. Optionally, this record is associated with user profiles of other which have been marked as friends, for example according to the connections defined in the social network.

Figure 3:
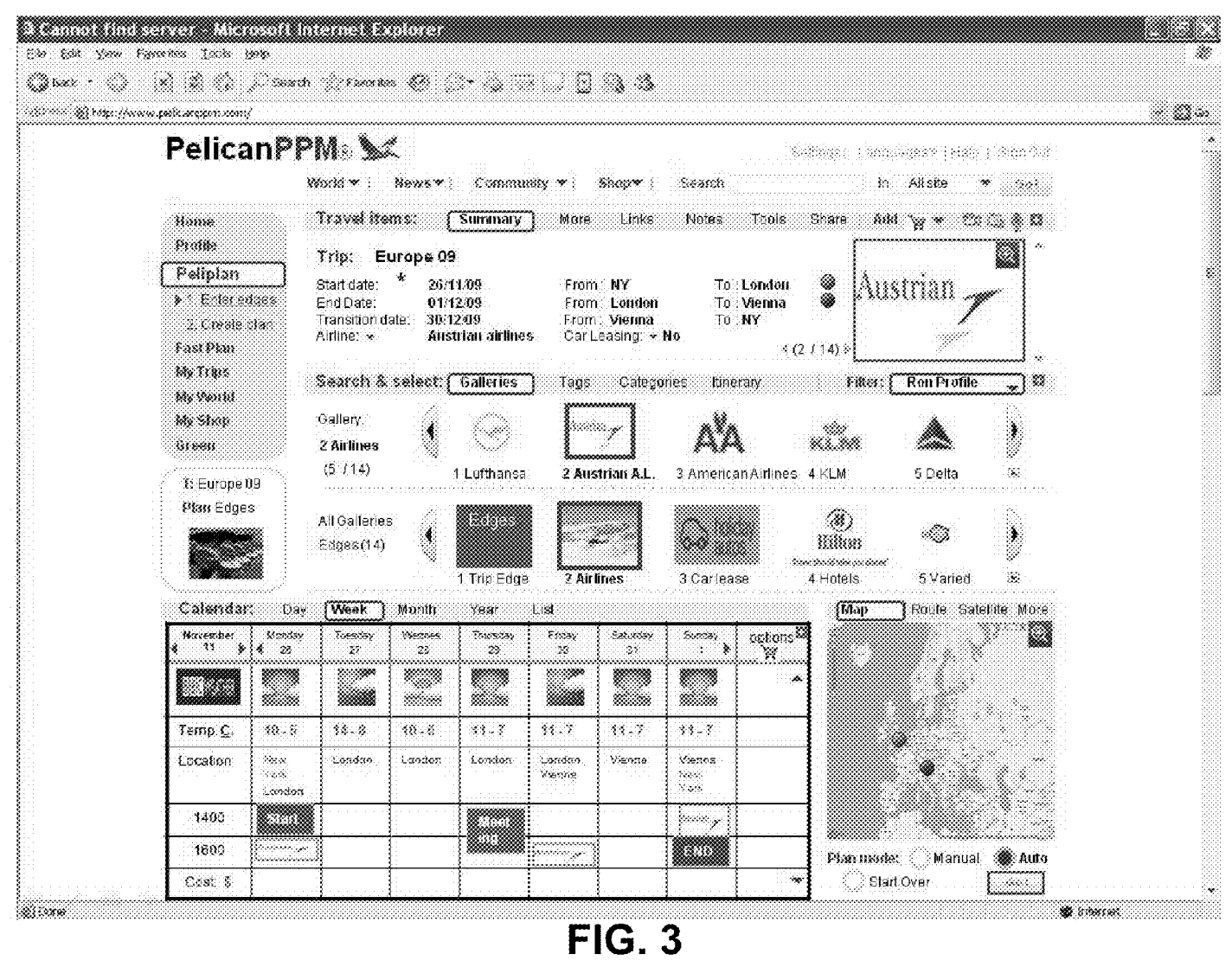

Additionally or alternately, the user 104 uses the client device 106 for creating and/or updating a travel profile. The travel profile, which is optionally stored at the one or more repositories 103, includes data that may be used for generating and/or managing the travel schedule, for example as described below. For example, FIG. 3 depicts an exemplary GUI, such as a webpage, for allowing the user to enter travel profile data. The travel profile includes a plurality of travel characteristics which are related to a certain travel. The travel characteristics may include one or more of the following:
1. Destination(s)—the location at which the travel is about to be held.
2. Origin—the location from which the travel is about to be held.
3. Travel period—the time at which the travel is about to be held.
4. Attendants—the number of attendants which join the traveler. Optionally, the traveling period of each attendant is defined, for example the joining and departure time events and/or locations—indicating the participation period.
5. Type—the type of the trip—a business trip, a family trip, a single trip, an extreme sport trip, a family roots trip, and the like.
6. Budget—the total budget of the trip, the maximum expense per travel object, a maximum expense per day and the like.
7. Travel services definitions—services used before, during or after a travel, for example selected airlines, selective transportation means, selected leasing companies and the like.

Each one of the travel characteristics may define one or more suspending conditions, such as a visa, a commuting ticket, such as a flight ticket, equipment, one or more vaccinations and the like.

Optionally, the user 104 inputs, via the client device 106, a path and/or a list that includes a number of geographical destinations and the traveling period. For example, from the London U.K. to Granada, Spain in five days.

Optionally, the user 104 inputs, via the client device 106, one or more anchors, dates in which she has to be in a certain location, for example attending the performance of Leonard Cohen on the 13th of September.

As described above, the system 100 includes one or more repositories in which a plurality of travel objects are stored. Each travel object includes a plurality of scheduling characteristics. The scheduling characteristics may include:
1. Availability period—the time at which the travel activity may be held, for example daily site opening and closing time, days at which the site is opened and the like.
2. Age classification—the age at which travelers may participate in the activity. For example age classification for movies, theater plays, and museums.
3. Geographic location—coordinates and/or address that allows identifying the location of the travel activity.
4. Travel activity span—an estimated travel activity span. Optionally, a number of estimated travel activity spans are defined, each for a different traveler profile, for example for a traveler at a different age, different medical condition and the like.
5. Description—media content, such as textual, vocal, and/or visual content describing the travel activity, for example one or more of the following textual content, images, video, links, blogs, advertisements, reviews, notes, communication messages and the like.
6. Booking period—the time at which the travel activity should be booked. For example, how many days in advance a ticket for the travel activity should be ordered.
7. Booking details—details that allow ordering the travel activity, for example purchasing a ticket or booking a spot.
8. Suspending conditions—conditions that if fulfilled causes a travel activity to become valid, for example the age of the traveler, the health of the traveler, whether the traveler has a certain visa or not, an education level, for example a ski surfing skill level, whether the traveler rented a vehicle or not, whether the traveler has a driver license or not, one or more previously performed travel activities which have been performed during past trips, and the like.
9. Context relation to other travel objects—a list of contextual relations to other travel objects, for example belonging relation, proximity relation, purchase dependency relation and the like. For example, a restaurant within a museum, event within a museum, a museum that its entry ticket is included in another museum ticket or a nearby ice cream parlor that can be an extension of a visit to shopping center.
10. Cost—the cost of the traveler activity.
11. Weather requirement—the weather at which the travel activity may be held.
12. Cultural relevancy—the type of cultural activity, for example genre for musical activity and the like.
13. Social relevancy—a list of user profiles of the users who have experienced the travel activity.

The travel objects may represent a site for site seeing, a concert, a restaurant, an hotel, a site seeing track, a museum, an amusement park, and/or any other touristic activity.

Optionally, the travel objects are arranged in different clusters, for example according to their types. FIG. 8B depicts an exemplary arrangement of travel object clusters in the travel objects repository 103. In this embodiment, the travel objects are divided among the following clusters:
1. Arrangements—travel objects which require achieving other travel objects or concerning the effect of other travel object on ordinary life. Examples include car parking at the airport, planning activity and/or the activity of purchasing a destination travel guide book. Reservation activity with definition of time and limitations that for example needs to be done a certain amount of days in advance such as internet reservation that requires confirmation and/or car leasing during the high touristic season. These arrangements may be pre travel, during travel and/or post travel objects taking place at the origin of the traveller, during transit and/or at the travel destination.
2. Attractions—travel objects such as sites and routes.
3. Touristic events—travel objects such as performances, concerts and meetings.
4. Accommodations—travel objects such as hotel, hosting friends and/or B&B.
5. Dining—travel objects such as restaurants, self provided kosher food, pre ordered kosher food, and the like.
6. Transportation—travel objects such as train or bus or plane or on foot travel.

Optionally, the user 104 inputs, via the client device 106, one or more self created travel objects, for example a new preferences item such as American Cup yacht competition. Optionally, the user 104 inputs the level of importance of the travel objects. Optionally, the user 104 characterizes the self created travel objects, for example by defining the type thereof.

One or more of the travel objects may represent pre travel activities, such as service reservation. Such an activity includes booking a flight, a hotel, a rental car, insurance, ski clothing, ski equipment, hiking clothing, hiking equipment and the like. These objects may be replaced with a travel object that describes the reserved activity after the respective reservation is performed and/or confirmed. Optionally, the execution of the reservation is a condition for selecting the reserved activity.

Optionally, each travel object is associated with travel information.

Figure 4:
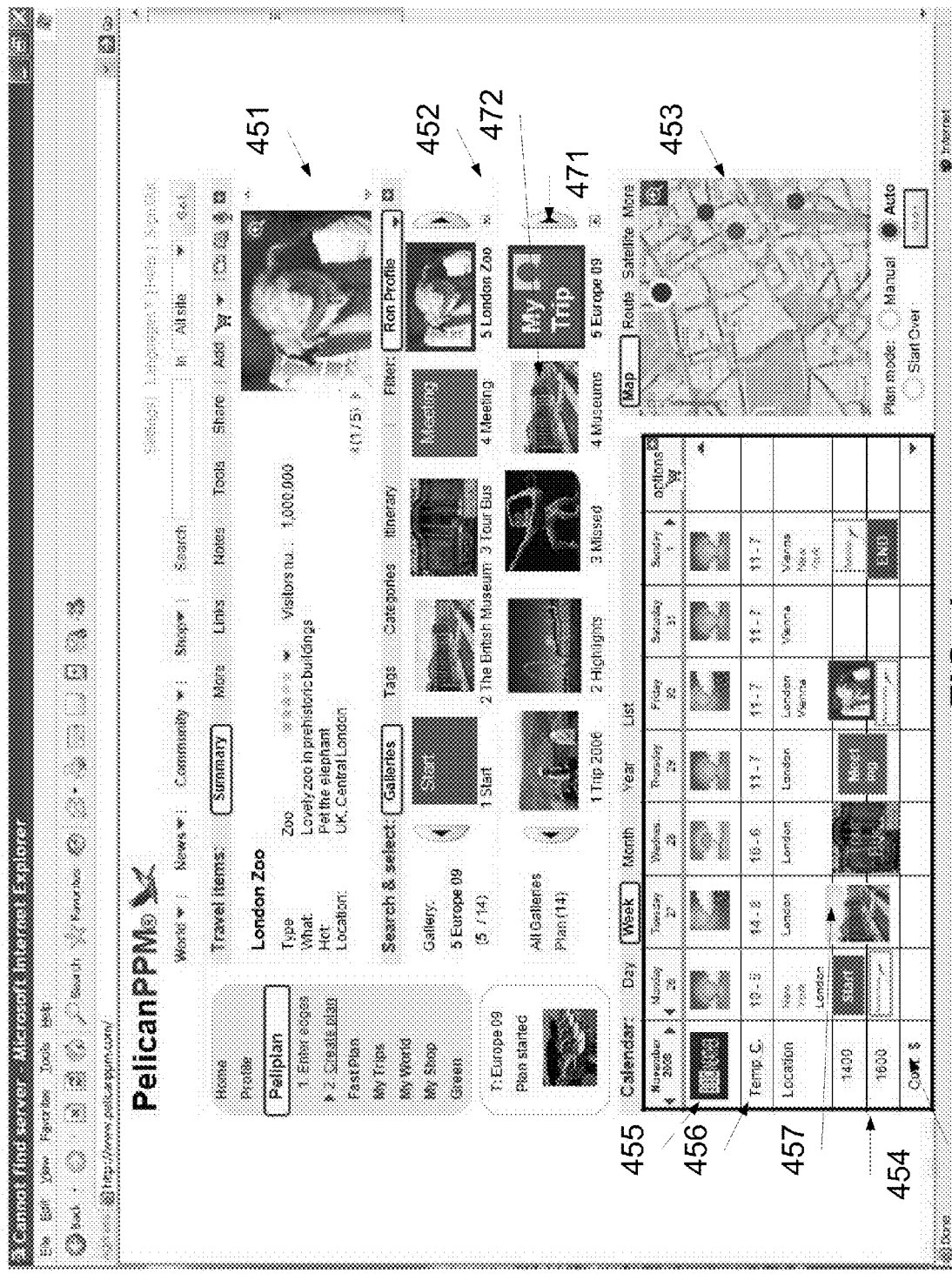
FIG. 4 is an exemplary GUI, such as a webpage, which allows the user to select travel objects, according to some embodiments of the present invention.

Optionally, the user 104 inputs, via the client device 106, one or more self created, travel profile items and ranking, for example a new item such as a car leasing agency, for example Goldcar in Spain, and optionally a ranking thereof. In use, the user 104 uses the client device 106 for selecting a group of travel objects that represent a group of travel activities. The selection may be performed from a suggested group of travel objects selected according to the user and/or travel profiles. For example, FIG. 4 depicts an exemplary GUI, such as a webpage, which allows the user to select travel objects. The GUI displays details about selected objects 451, the display of multiple trip relevant travel objects in a galleries view format for searching, selecting and suggesting groups of travel objects and the specific selected travel object 452, a map 453 depicting the location of the members of the suggested travel objects, and a schedule 454 depicting additional data such as estimated weather condition 455, estimated temperature 456, estimated cost 458 and optional scheduling 457 of the member from the suggested group of travel objects.

Additionally or alternatively, the travel planning manager 105 may automatically select one or more travel objects according to the user selections and/or user and/or travel profiles. For example, if the travel profile indicates that one of the destinations requires a Visa, a vaccine, the travel planning manager 105 automatically adds or automatically offers a related travel object that defines a pre travel activity of acquiring a visa and/or applying for a visa. In another example, if the user profile indicates that the medical condition of the user requires certain medications, the travel planning manager 105 calculates the amount of medications needed.

Additionally or alternatively, the travel planning manager 105 may automatically select one or more travel objects according to the budget defined in the travel object.

Figure 5A:
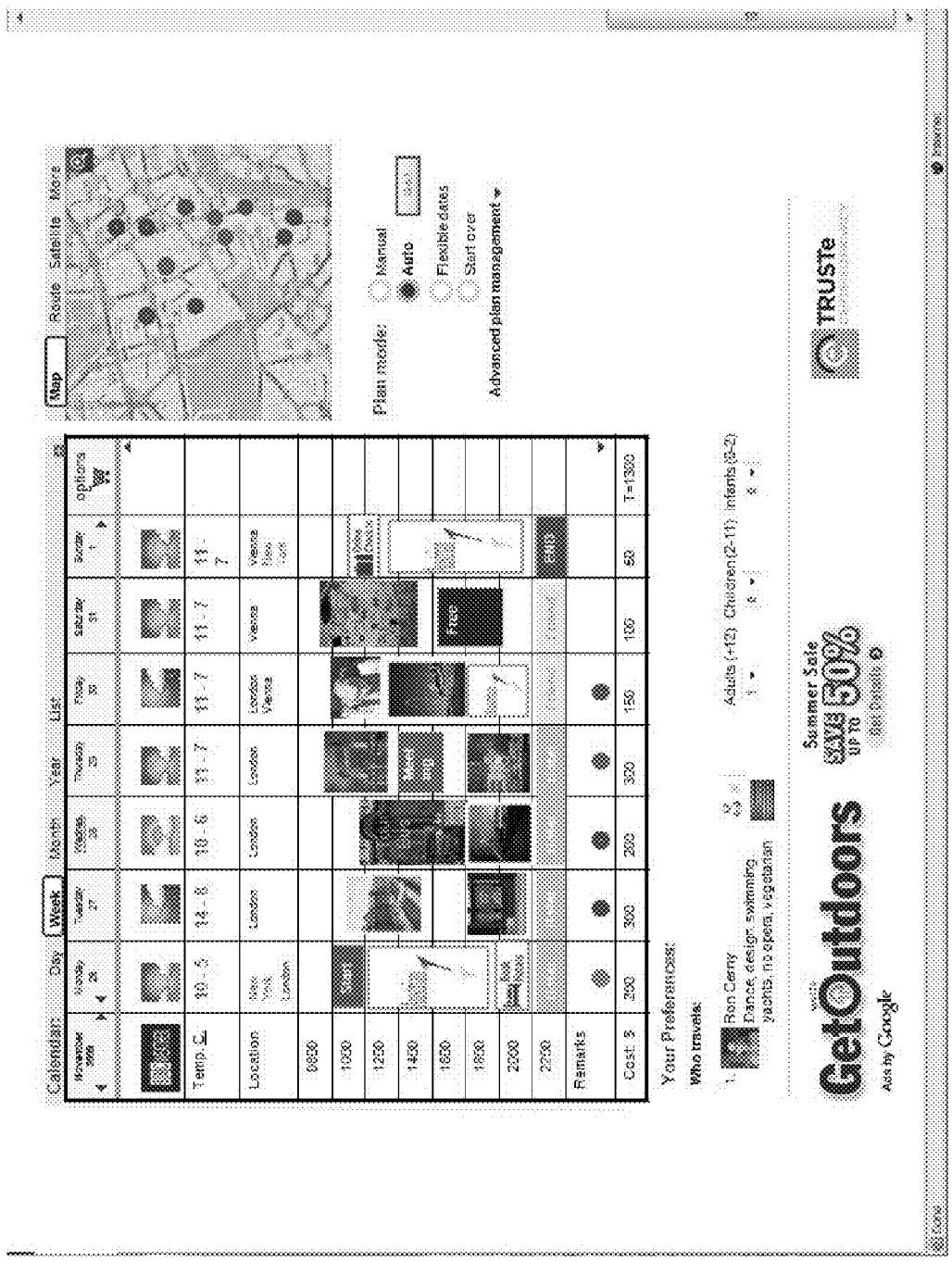
FIG. 5A is an image of an exemplary travel plan which is created and presented to the user on the client device, according to some embodiments of the present invention.
Figure 5B:
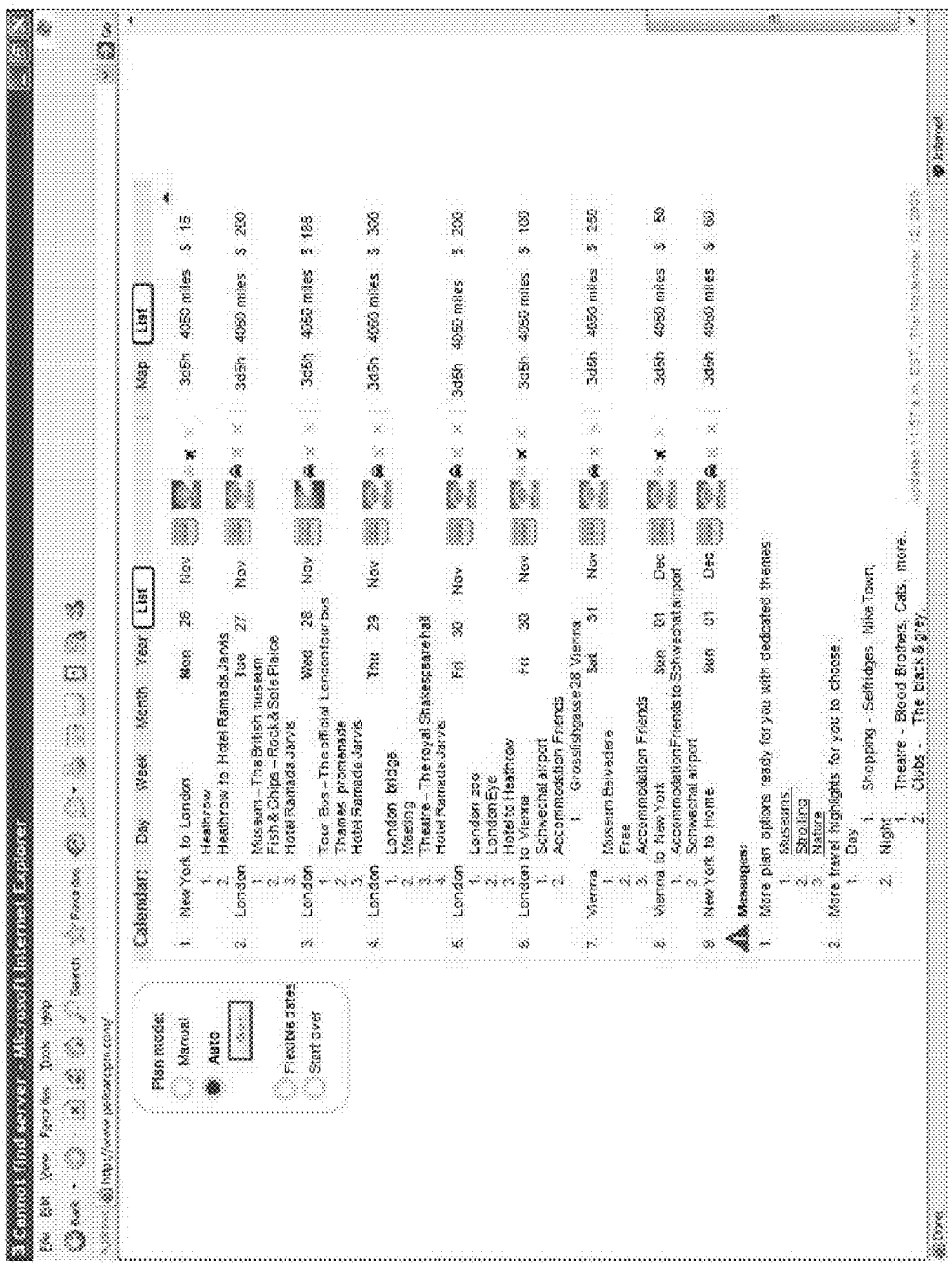
FIG. 5B is an image of a list display of an exemplary travel plan which is created and presented to the user on the client device, according to some embodiments of the present invention.
Figure 5C:
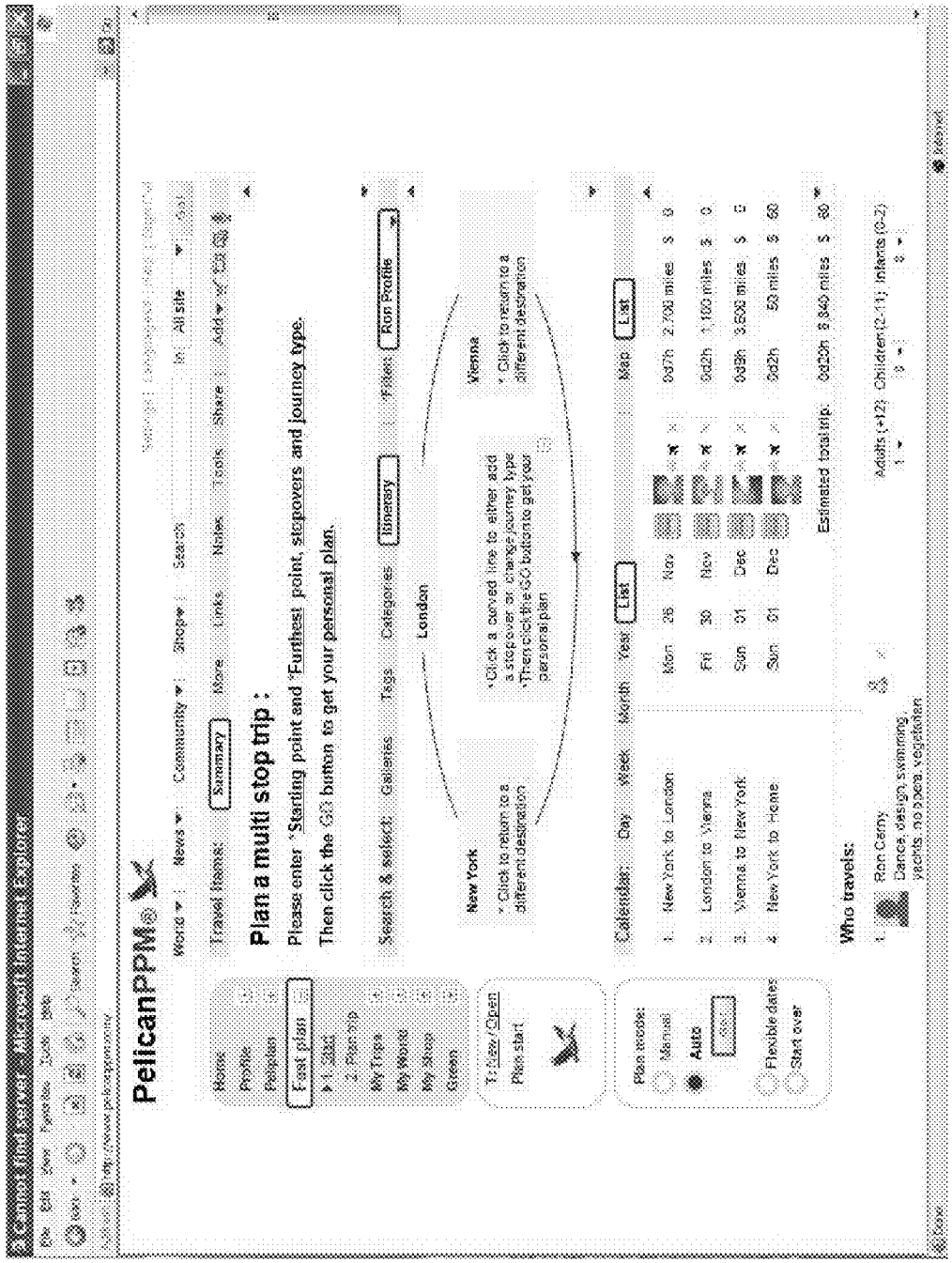
FIG. 5C is an image of a summary display of an exemplary travel plan which is created and presented to the user on the client device, according to some embodiments of the present invention.
Figure 5D:
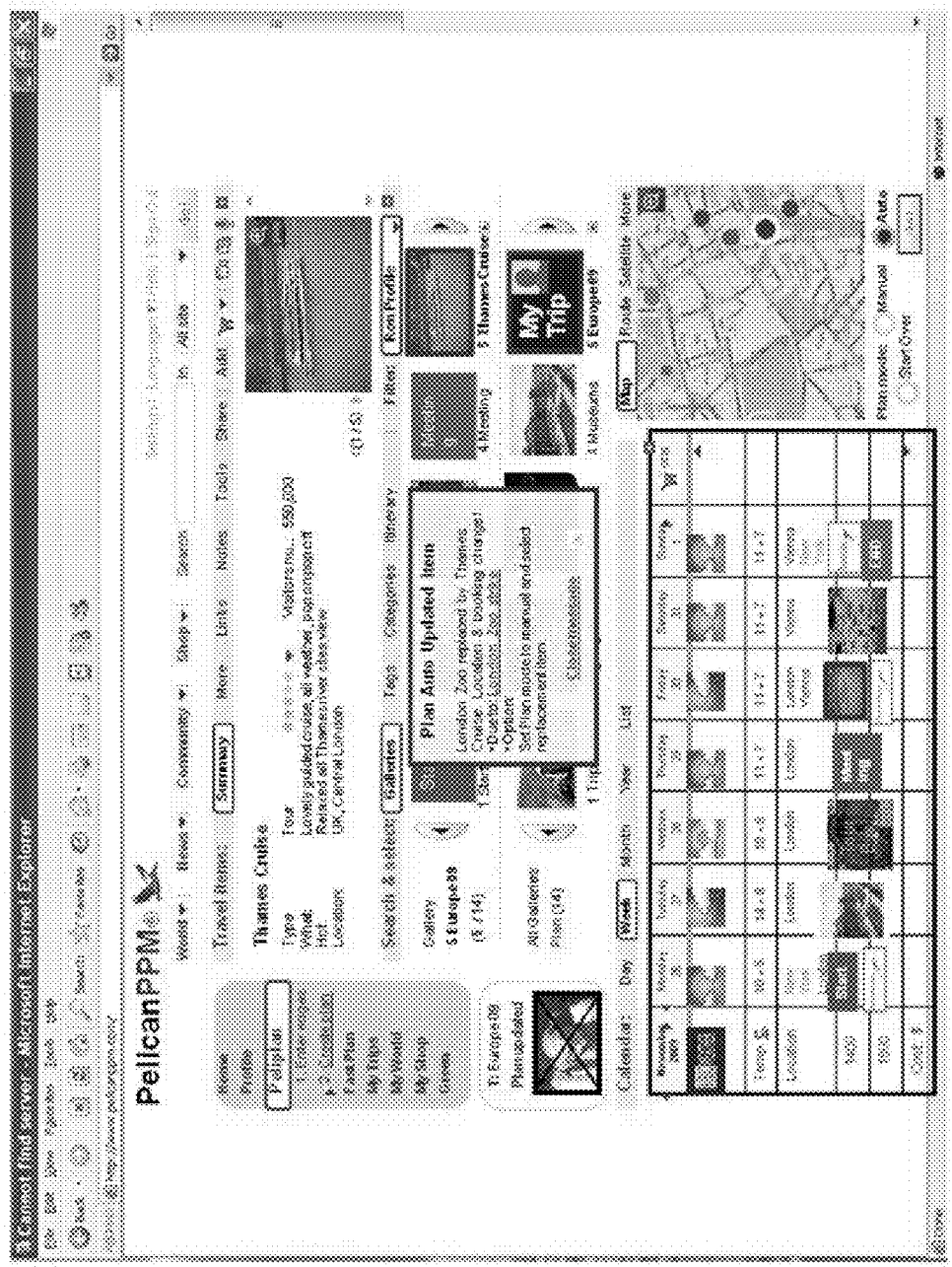
FIG. 5D is an image of a summary display of an exemplary travel plan updated in real time and presented to the user on the client device, according to some embodiments of the present invention.

Now, the travel planning manager 105 creates a travel plan wherein each travel object, which is selected by the user and/or the travel planning manager 105, is scheduled. The scheduling of each travel object is optionally performed according to travel context scenario logic. The travel context scenario logic is based on the scheduling characteristics of the travel object and optionally the relationship between its scheduling characteristics and the scheduling characteristics of other selected travel objects and/or the user profile and/or the travel profile. For example, a travel object that defines a site in a certain location is scheduled according to the location of travel objects which define sites in other locations. Optionally, the travel object is scheduled according to the potential travel object of transportation. For example, the travel object is scheduled according to cost. Optionally, the cost is calculated according to tariffs set according to the user, for each tariff may change if the student has a student card. FIG. 5A is an exemplary travel plan which is created as described herein and presented to the user 104, on the client device 106. FIG. 5B is a list display of the exemplary travel plan. FIG. 5C is a display of a summary of the exemplary travel plan. FIG. 5D is an exemplary travel plan which is where one travel object is replaced with another due to schedule change. For example, in the depicted example the travel object London ZOO has been replaced with the travel object Thames cruise as the London Zoo went on strike and Thames river cruise cards have been approved. As shown in FIG. 5D, an indicative pop up is displayed to the user.

As further described below, scheduling may take into account other parameters, such as the user characteristics as defined in the user profile, for example age and medical condition and/or travel characteristics as defined in the travel profile. Optionally, scheduling may take into account other parameters, such as real time and/or estimated environmental conditions, such as the weather and/or currency exchange rate change and/or real time traffic parameter between different locations, for example estimated traffic data, such as commuting means and/or traffic congestion from a traffic website and/or any other external source.

Optionally, the user may create a travel object, which has scheduling characteristics. This object may be manually added to the travel plan and/or repository and manually scheduled and/or automatically by the travel planning manager 105 for example as a new item with a high ranking.

Optionally, one or more of the travel objects represent an arrangement event scenario, such as a passport lose scenario, a luggage theft event, a credit card theft event and the like. For brevity, the travel objects may be referred to herein as event objects. In such an embodiment, the user may add an event object in real time. The scheduling characteristics of such an event object travel define the actions the traveler should take in response to the added event. The travel planning manager 105 may automatically rearrange the travel plan in response to addition of such an event object, similarly to the addition and/or the update of a travel object, so that the traveler receives data about how to take care of the unexpected event as necessary in a manner that does not substantially effect the other travel objects. Optionally, the event object is defined in advance by the system operator. Each event object may be defined for a different city, a different country, a different district, and/or different user profile data and may be automatically selected according to the location of the traveler and/or his user profile.

Figure 5E:
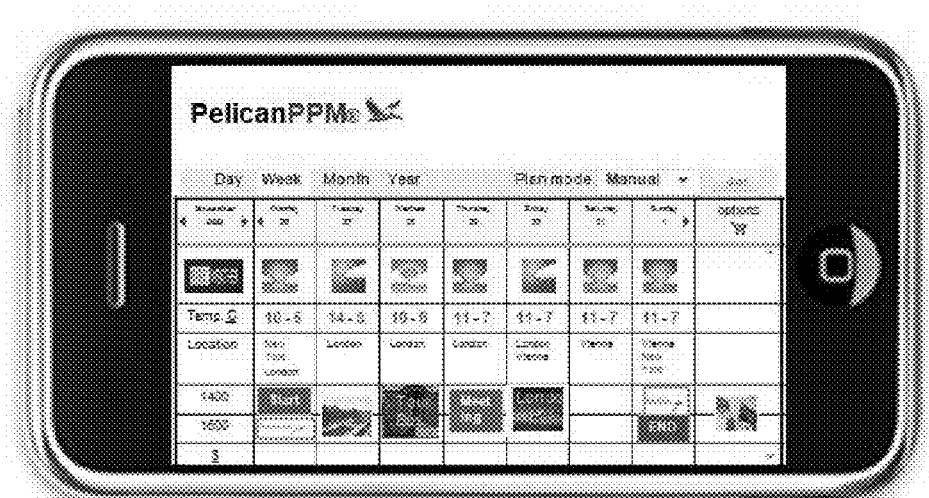
FIGS. 5E and 5F are images of exemplary GUI, such as depicted FIGS. 5A and 5D, when being displayed on a, handheld client device, such as a cellular phone, according to some embodiments of the present invention.
Figure 5F:
Figure 5G:
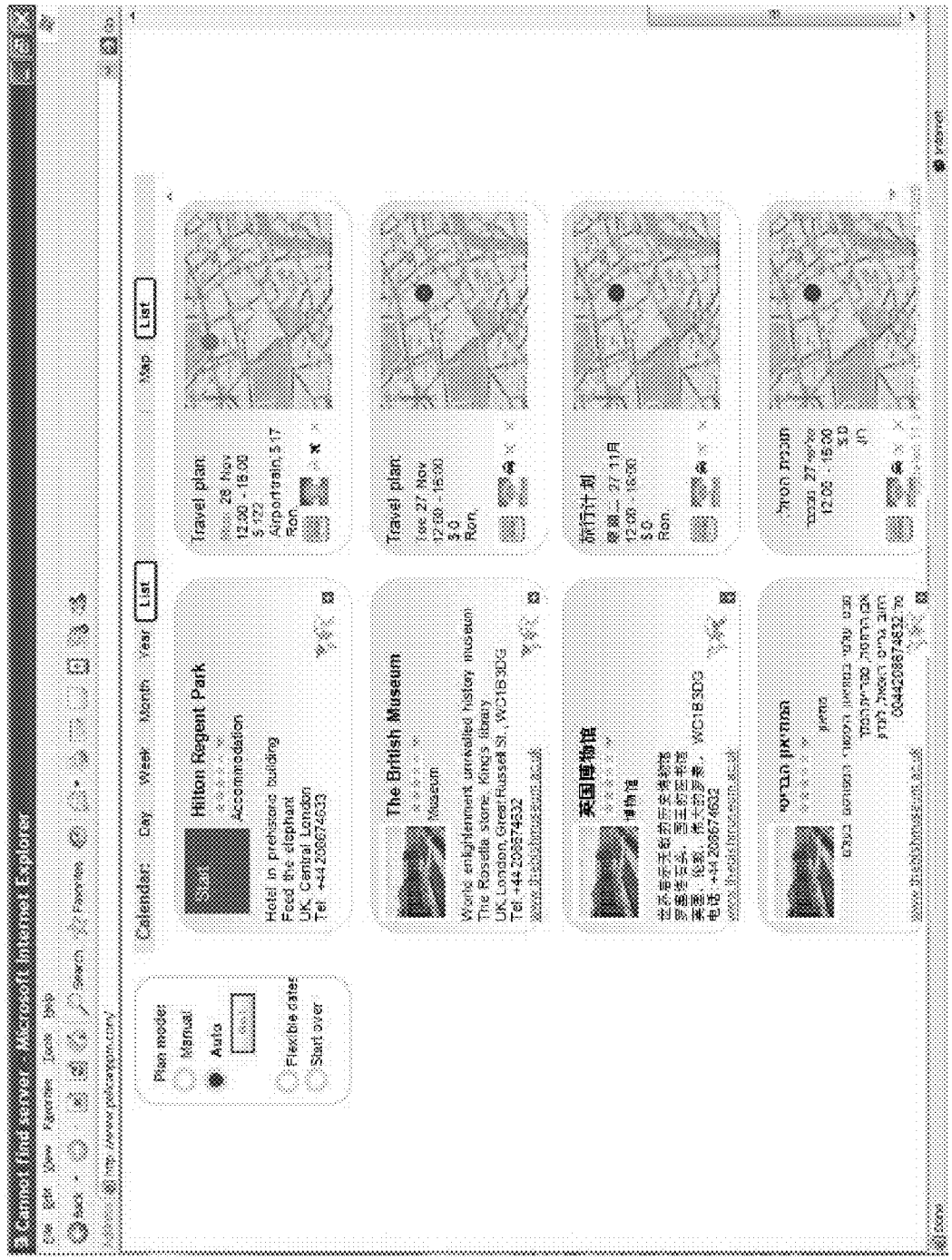
FIG. 5G is an image of a list display of the description of a certain travel object in a plurality of languages, according to some embodiments of the present invention.

As outlined above, the client device may be a handheld device, such as a cellular phone. FIGS. 5E and 5F are images of exemplary GUI, such as depicted FIGS. 5A and 5D, when being displayed on a cellular phone, according to some embodiments of the present invention;

According to some embodiments of the present invention, the system 100 includes a translation module. In such an embodiment, the textual content of each travel object may be translated by the translation module before the presentation thereof. The translation module is optionally an automatic translation module which translates the content according to methods which are known in the art and therefore not elaborated herein. In another embodiment, each travel object includes a description in a number of languages. The description which is presented to the user may be automatically selected according to the user preferences and/or the user origin, as defined in the user profile. For example, FIG. 5G depicts a list display of the description of a certain travel object in a plurality of languages, according to some embodiments of the present invention.

Figure 6:
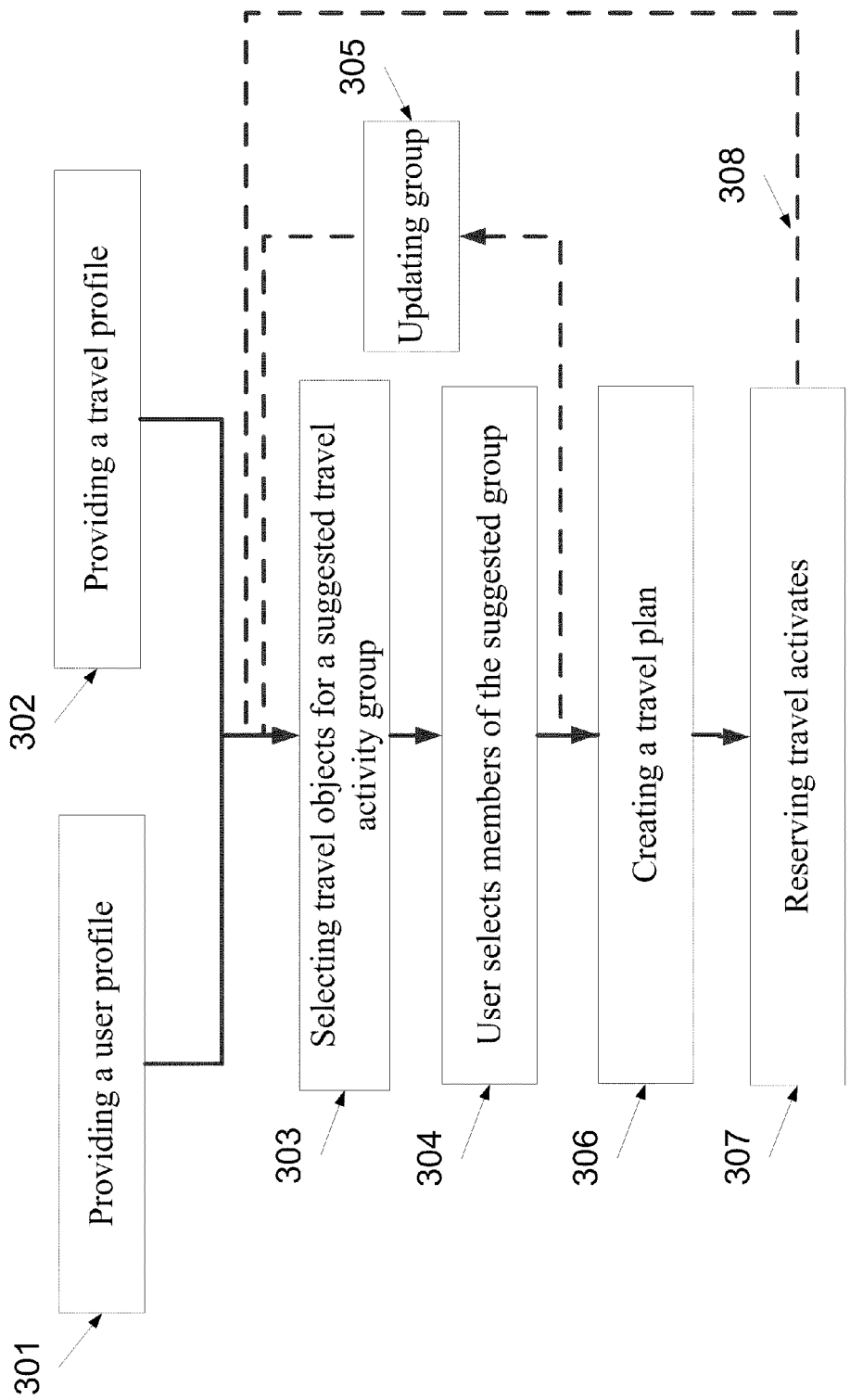
FIG. 6 is a flowchart of a method of planning a travel plan of a certain end to end traveling scenario, according to some embodiments of the present invention.

Reference is now made to FIG. 6, which is a flowchart of a method of planning a travel plan of a certain end to end traveling scenario, according to some embodiments of the present invention.

First, as shown at 301 and 302, a user profile and a travel profile are provided. Optionally, a GUI, such as a webpage, is presented so as to allow the user to open an account that includes some or all of the data that is defined in the user profile and/or travel profile. Optionally, a GUI is presented to the user so as to allow opening and/or updating the account. For example, FIG. 2 depicts an exemplary GUI web page for user profile entry and/or account opening and/or a new trip plan creation. For example, a user opened account with name Ron Cerny, entered personal data, travel preferences and partners. For example, FIG. 3 depicts an exemplary GUI web page for a user travel profile data entry. For example a trip plan was named Europe 09 and a travel profile was entered including travel origin, destinations, start, stop, a meeting, Austrian Airlines flights schedule and no partners.

Optionally, as shown at 303, one or more travel objects from the travel objects in the one or more repositories 103 are automatically selected. The selection is performed according to a match with the travel and/or the user profile. Optionally, the selected travel objects are placed in a list defining travel objects to be scheduled for the traveling plan of the end to end traveling scenario. The selected objects, which may be referred to herein as members of a suggested travel plan group are presented to the user. For example, FIG. 4 depicts an exemplary GUI web page that includes the suggested plan group 471, called My trip, and includes selected travel objects: Start, The British Museum, Tour Bus, Meeting and London Zoo and additional selected travel objects that kept in the repository Travel plans 103 and can optionally be displayed in the exemplary GUI web page.

Optionally, the travel objects are selected according to a match between the destinations at the travel profile and the geographic locations thereof. Optionally, each travel object is selected according to a match between the period defined at the travel profile and the availability period thereof.

Optionally, the travel objects are selected according to a match between the user characteristics of the user profile and characteristics of the travel objects from the repositories 103. For example, the match may be between the user's hobbies and the cultural relevancy and/or between the user's age and the age classification of the activity. For example, FIG. 4 depicts an exemplary GUI web page that includes a rubric 2 which includes selected travel objects of type museum selected to match the user characteristics.

Optionally, the travel objects are selected according to profiles of other travelers, referred to herein as partners. In such an embodiment, the user profiles of friends, for example as defined in the user's user profile, are analyzed to create a common travel profile used for the selection of travel objects, for example a user and a partner who both have a profile indication for yoga interest. The travel planning manager 105 matches the user profiles to identify such travel objects and selects them as described above.

Optionally, the travel objects are selected according to selections of other travelers referred to herein as partners. In such an embodiment, the user profiles of friends, for example as defined in the user's user profile, are analyzed to locate friends' travel objects which have been selected for their travel plans and/or reported as executed, for example as described below. In such a manner, the user may be presented with an indication that one of her friends is experienced with the suggested travel objects, for example visited a site, applied for a visa, booked a hotel, and flew with an airline and the like. The travel planning manager 105 matches the user profiles to identify such travel objects and selects them as described above.

Optionally, the suggested travel objects group is divided to a number of subgroups, optionally according to type of activity. For example, FIG. 3 is an exemplary webpage for allowing users to select members of the suggested travel plan group, presents various galleries which have been identified at the suggested travel activity. As shown at FIG. 4 other tabs allow the user to select travel objects from other subgroups.

Optionally, the creation of the suggested travel plan group involves checking the availability of its members. In such a manner, a travel object that represents a travel activity that is not available in light of the travel characteristics of the travel profile is not added to the suggested group of travel objects. Other travel objects may be added with a limitation that limits their scheduling according to their availability.

Now, as shown at 304, the user selects travel objects from the suggested group of travel objects. Optionally, a selection is performed by dragging icons indicative of the travel objects to a designated area and dropping them there.

Optionally, as shown at 305, the suggested travel plan group is updated according to the travel objects which are selected by the user. For example, if the user selects a travel object of a travel activity located in a certain location, one or more travel objects of travel activities which are held or placed nearby are added to the suggested travel plan group.

Additionally or alternatively, the travel planning manager 105 may automatically select travel objects from the suggested travel plan group. For example, the travel objects validating a passport and booking connection flights and/or train tickets. The travel planning manager 105 may automatically select other travel objects, such as renting a car, if some of the suggested group of travel objects members include out of town activities.

Optionally, the members of the suggested travel plan group are weighted according to their significance to the traveler. The weighting may be manually preformed by the traveler and/or automatically by the travel planning manager 105. The automatic weighting may be performed by scoring the match between the characteristics of the weighted travel object and the characteristics of the user and/or the travel profiles and/or a set of travel context scenario logic rules, for example a limit to selecting more than two exciting travel objects for a user with children at the ages six to fourteen or for example visiting places that have been seen in past trips. The automatic weighting may be performed in different categories. For example, while all the museums are ranked in relation to one another, the shopping centers are similarly and separately ranked in relation to one another.

Additionally or alternatively, the automatic weighting may be performed according to touristic popularity, for example taken from a third party source such as tripadviser.com, from analyzing the positiveness of remarks in travelers forums and/or from the number of references in the web. In such an embodiment, the system 100 includes a data analysis module which analyses the third party sources for estimating touristic popularity. The analysis may be semantic and/or according to network users' scoring, optionally according to methods which are known in the art.

Optionally, the weighting is changed by the user interactions where a user may delete an item, change its weight, change its relation to other travel objects, and/or the category to which it belongs.

Optionally, the user 104 inputs, via the client device 106, one or more self created, travel context planning rules and/or weighting, for example visiting two museums and 2 restaurants on specific travel days are not acceptable. Than, as shown at 306, a travel plan is created according to the relations between the different scheduling characteristics of the selected travel objects and the user and/or travel characteristics. Optionally, the travel objects are scheduled in the travel plan according to their weight. The highest is the weight the highest is probability of being scheduled in the travel plan. Optionally, the travel plan objects are displayed on a map and/or a connecting travel route. For example, the route may start at the travel starting point of a user, such as his home address and continues through the airport parking lot, a meeting point with a trip partner, a flight check boot and the like.

The selected travel objects are scheduled in a travel plan so as to best fit the travel profile and to increase the total weight of the scheduled travel objects, the time utilization, the budget utilization and/or the user profile. The schedule order and itinerary location of items may be changed by user interaction where the user may delete an item, change its schedule and its order in the itinerary.

Optionally, the travel plan is a full scenario travel plan that starts at the stage of a user travel decision, namely the day of creating the travel plan and ends when the user finished all the post travel activities.

Figure 7:
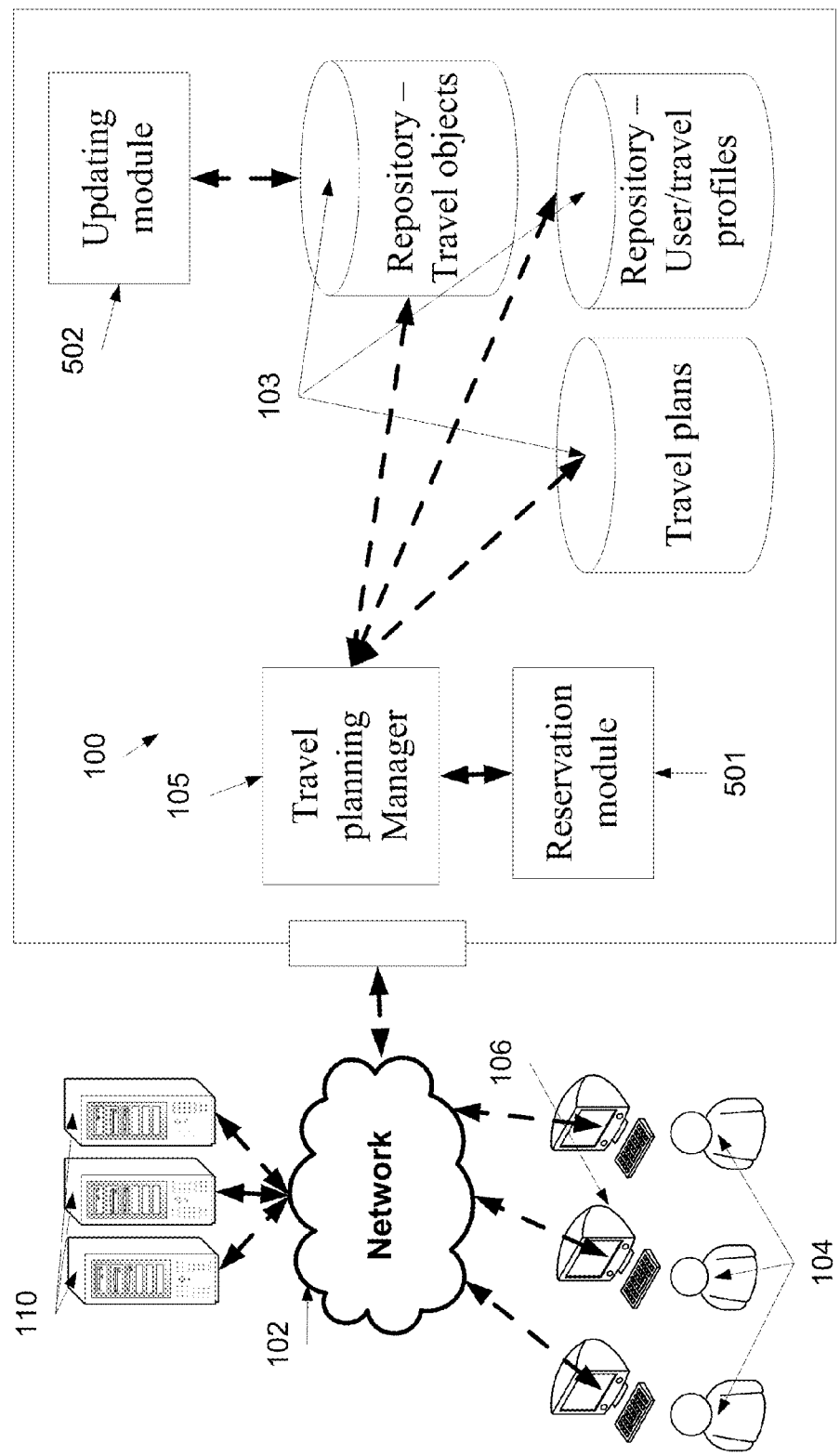
FIG. 7 is a schematic illustration of a system as depicted in FIG. 1 with a reservation module, according to some embodiments of the present invention.

Optionally, as shown at 307, the system 100 performs reservations for the user according to the travel plan. Optionally, as shown at FIG. 7, the system 100 includes a reservation module 501. The reservation module 501 books and/or orders pre travel activities, travel activities, and/or post travel activities as defined in the travel plan, according to their schedule. Optionally, the reservation module 501 allows the user to confirm the reservation.

Optionally, the reservation module 501 reports to the user when the booking and/or ordering have failed. Optionally, the reservation module 501 instructs the travel planning manager 105 to provide alternatives to travel activities which have not been booked and/or ordered. The alternatives are optionally added to the suggested group of travel objects, allowing the user to reselect object travels and create a new travel plan accordingly. Optionally, the reservation module 501 bills the client account according to the successful booking and/or ordering.

The travel plan now includes travel objects that represent pre travel activities, such as reservations and visa issue, travel objects that represent travel activities, such as sites to visit, and travel objects that represent post travel activities, such as photo album ordering, in plan integration of photos or of user created travel objects.

According to some embodiments of the present invention, the system 100 further comprises an updating module, as show at 502 in FIG. 7, for updating the travel objects and/or for adding new travel objects and/or deleting old travel objects. The updating module creates and/or updates travel objects according to data collected from third party servers. For example, travel objects that define concerts and/or movies may be collected from ticket servers, such as ticketmaster.com, travel objects that define restaurants and/or bars may be collected from various websites of local weekly listing magazines for particular cities, such as TimeOut™ New York and TimeOut™ London, travel objects that define user security or documentation requirements may be collected form official web sites such as Travel, Transportation and Recreation; Official information and services from the U.S. government: http://www.usa.gov/Citizen/Topics/Travel.shtml.

Optionally, the updating module 502 verifies the relevancy of travel objects of the travel plans which have been generated by the system 100. In such embodiments, the travel plan is recreated and/or updated according to real time information, for example change in the opening and/or closing time of a certain site and the like. The updating module 502 may verify the relevancy of the travel plan itself in light of real time data such as weather, currency exchange rate change, a strike, and an electrical power interruption.

For example, a travel object, such as a concert, which is added to the travel plan, may be monitored to detect whether an unexpected cancellation has occurred. In such a manner, if the concert is cancelled, the traveller is informed in real time and a new travel plan that provides a new scenario is created.

Optionally, the updating module 502 updates the traveller whenever a new travel object, which matches his travel and/or user profile, is available. The notification may be sent as an email and/or a short message service (SMS) or appear in a pop up window and/or a user registered web service such as twitter.com and/or another on the notification on the client device 103. In such a manner, information such as an artist that surprisingly appear in a location which is close to the traveller path is presented to the traveller, allowing her to change the travel plan accordingly, optionally automatically.

Optionally, the travel planning manager 105 updates the traveller partners and/or relevant service providers whenever a user travel plan update is available. The notification may be sent as an email and/or a short message service (SMS) or appear in a pop up window and/or another on the notification on the client device 103 and/or integrated in third party applications interface. In such a manner, information such as a change of a location set for a meeting is presented to travel partners allowing them to accept or reject such an update.

Figure 8A:
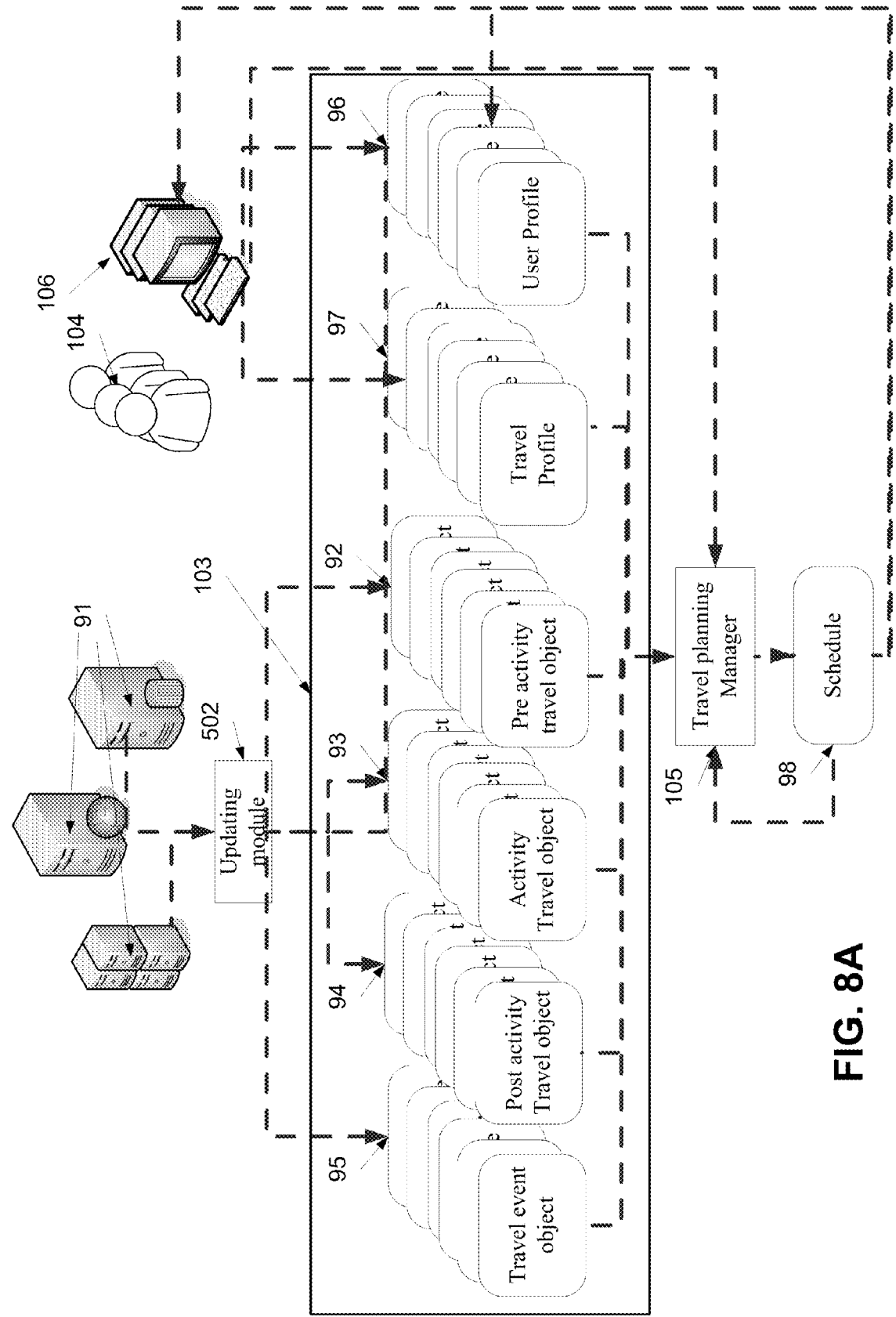
FIG. 8A is a schematic illustration of data flow in the system, according to some embodiments of the present invention.
Figure 8B:
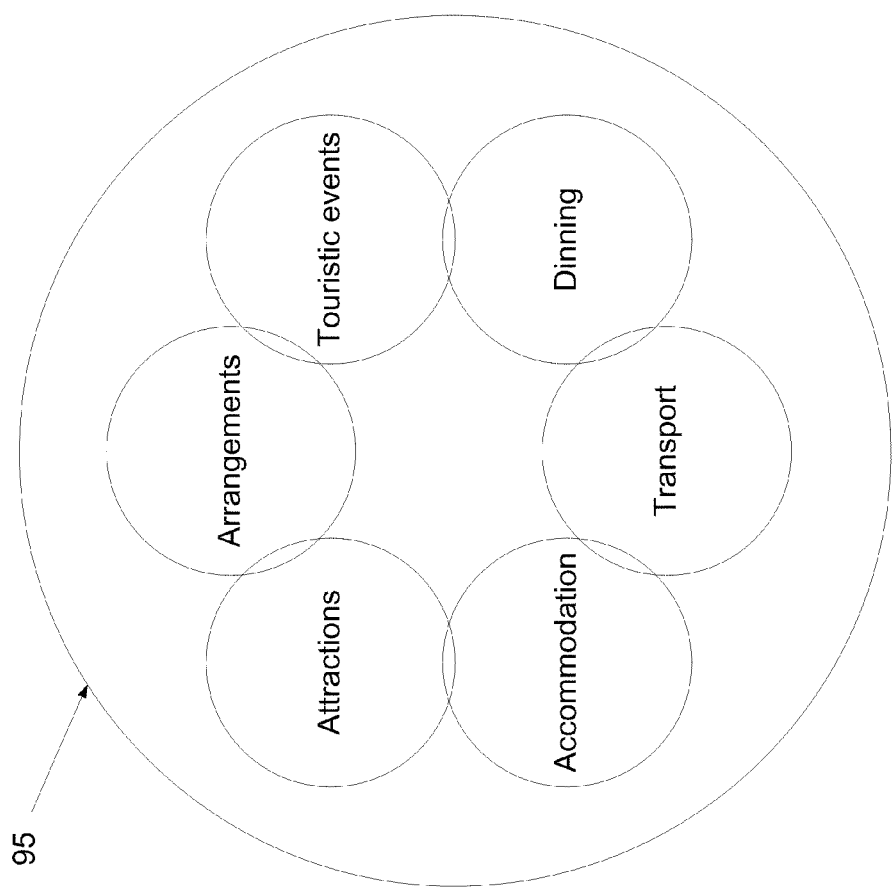
FIG. 8B is a schematic illustration of an exemplary arrangement of travel object clusters, according to some embodiments of the present invention.

Reference is now made to FIG. 8A which is a schematic illustration of data flow in the system 100, according to some embodiments of the present invention. As shown in FIG. 8A, the updating module 502 monitors changes to the travel objects. The updating module 502 is optionally connected to network nodes via a network, such as the internet. The network nodes 91 may be websites and/or database as described above. In use, the updating module 502 updates the travel objects, for example the objects that define pre travel activities 92, such as selecting a destiny and planning travel activities, for example purchasing suitcases, objects that define travel activities 93, which include commuting, site seeing, dinning, lodging, shopping, and other travelling activities, and objects that define post travel activities 94, such as arranging and developing images and videos activities, ordering photo album activities, acquiring V.A.T refunds activities and the like. Optionally, the updating module 502 updates the travel objects which represent event scenarios 95, for example as defined below. The updating is performed before and/or during and/or after the travel period. As shown in FIG. 8A the client devices 106 allow users to update their user profile 96 and/or their travel profiles 97 and/or the travel objects before and/or during and/or after the travel period. Additionally or alternately, the users may update the arrangement of the travel objects in the schedule. The travel planning manager 105 receives the updated travel objects, the updated arrangement, and/or the updated profiles and recalculates the schedule 98 to create an updated version thereof. The updated version is set to fulfill constrains which are set by the scheduling characteristics of the selected travel objects and profile characteristics of the profiles. The updated schedule 98 is forwarded to the client device and/or stored in her user profile for future analysis, for example as described herein.

Optionally, the updating module 502 updates the user profile, for example according to changes pertaining to the respective user, for example his social connections in a social network. The changes are detected by monitoring the user account in a social network, his contacts and the like. In such a manner, the travel objects experienced by the new connections may be selected or presented to the user, for example as described below.

Figure 9:
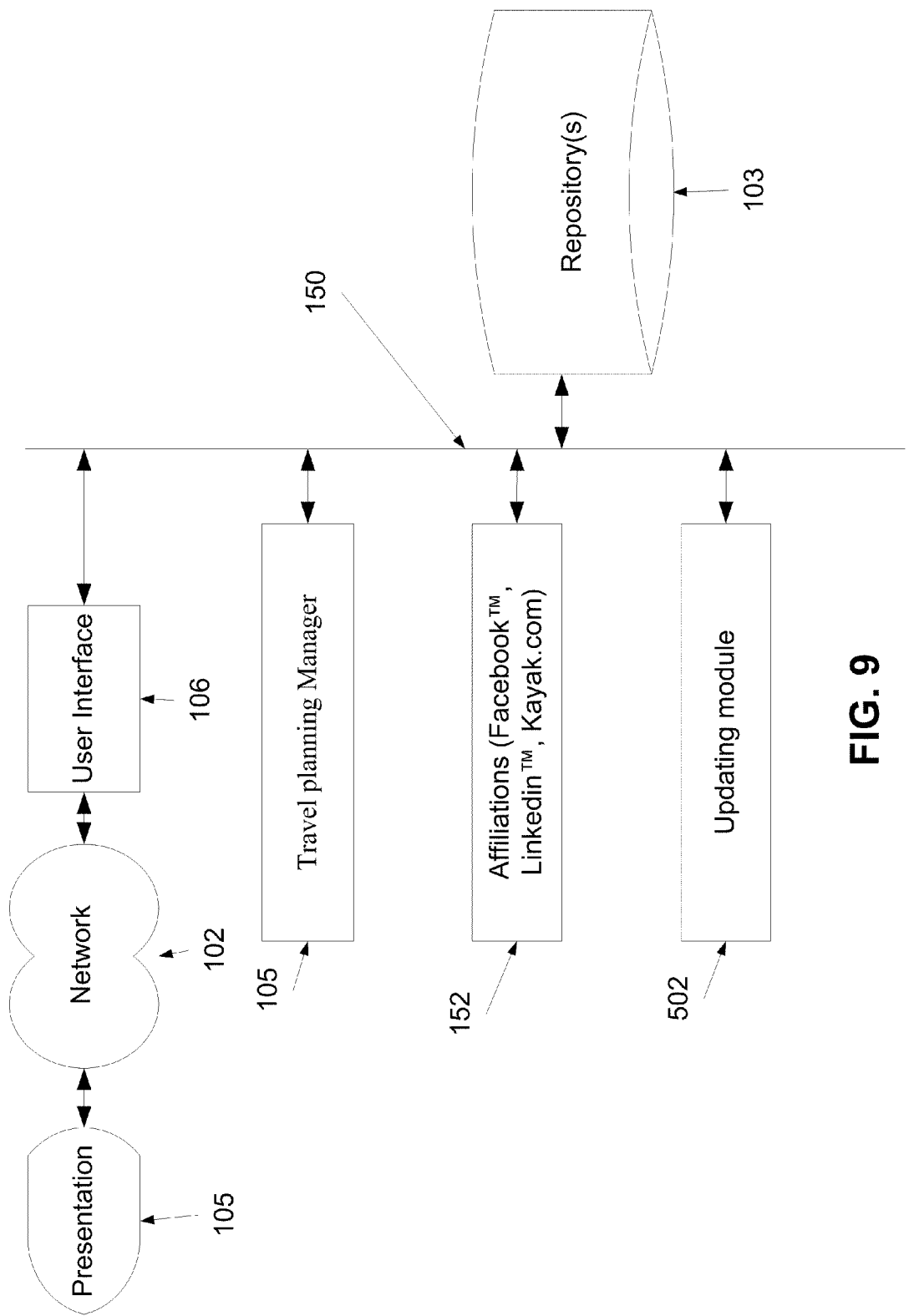
FIG. 9 is a schematic illustration of an exemplary architecture a distributed system, according to some embodiments of the present invention.

It should be noted that the components of the system 100 may be implemented on any number of servers, in different architectures. For example, FIG. 9, depicts an exemplary architecture of the system 100 where a bus 150, optionally virtual, connects among the components of the system 100 for example among the repository 103, the manager 105, the user interface, for example of the client device 106, and the updating module 502. Each component may be stored on a different server. Optionally, the travel plan is presented on a different device, as shown at 105, for example on the cellular device of the user. The display and plan management interaction may be done simultaneously on multiple devices and/or by different users for example such as partners of a travel plan. The virtual bus may be connected to affiliates 152, such as social network websites and/or as travel related businesses, as described above.

Figure 10:
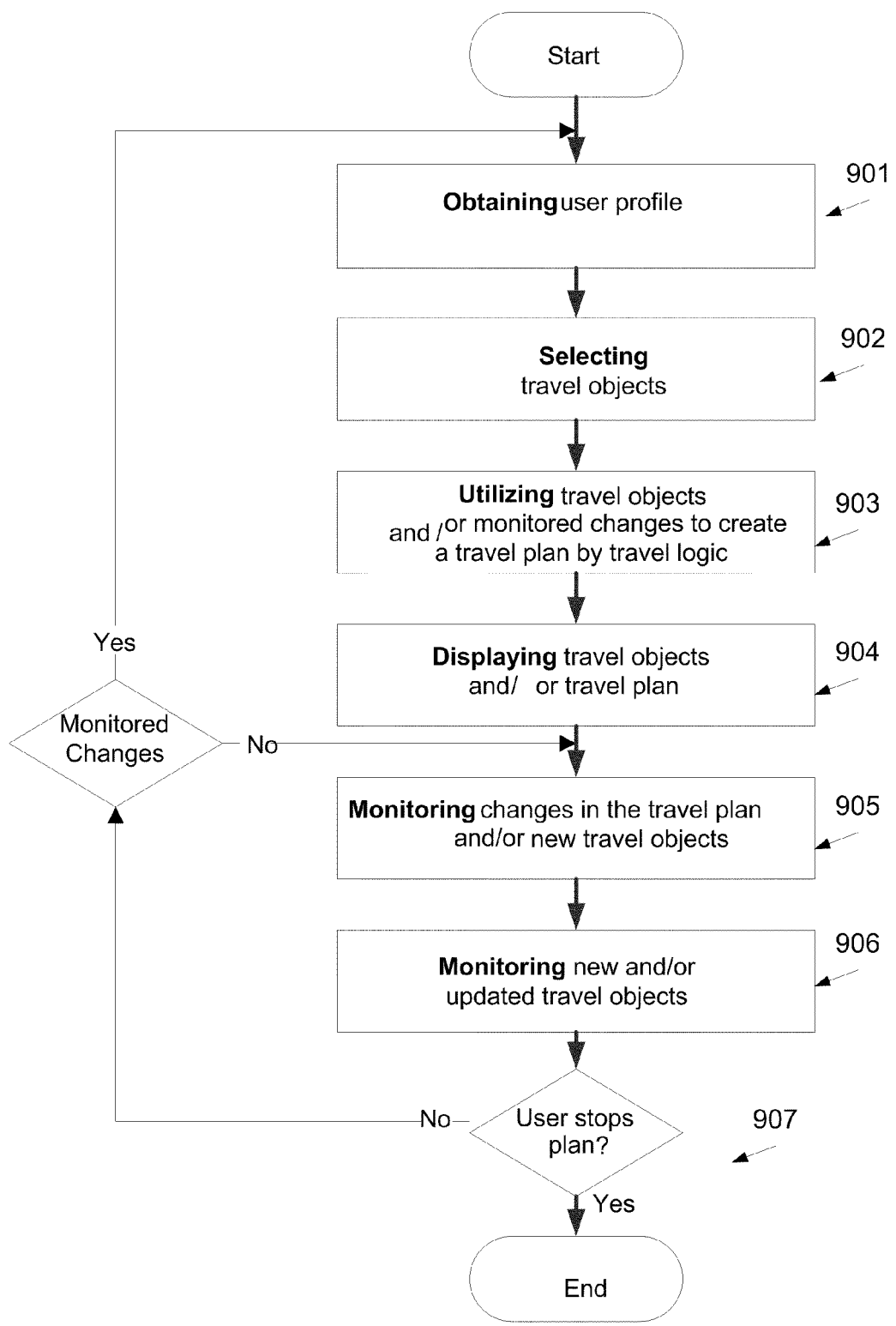
FIG. 10 is a flowchart of a method of updating a travel plan in real time, according to some embodiments of the present invention.

Reference is now made to FIG. 10, which is a flowchart of a method of updating a travel plan in real time, according to some embodiments of the present invention. Blocks 901-903 are similar to 303, 304, and 306, which are described above. As shown at 904, actions performed in these blocks allow displaying the selected travel objects and/or travel plan to the user.

As shown at 905, changes to the travel objects in the repository 103 are monitored. In such a manner, the travel plan may be amended, optionally automatically, when one of the travel object changes. For example, if a certain site changes its availability during the period scheduled for it in the travel plan, a new spot is identified for it and/or a replacement travel object is suggested to the user.

As shown at 906, the addition of new travel objects to the repository 103 is monitored. The travel planning manager 105 may automatically select new travel objects to replace selected travel objects and/or present them to the user, for example as a pop up is they match the user selections and/or user and/or travel profiles. As shown at 907. This process is iterative and may last as long as the travel plan is not fully executed and/or stopped by the user and/or stopped by the system manager.

Figure 11:
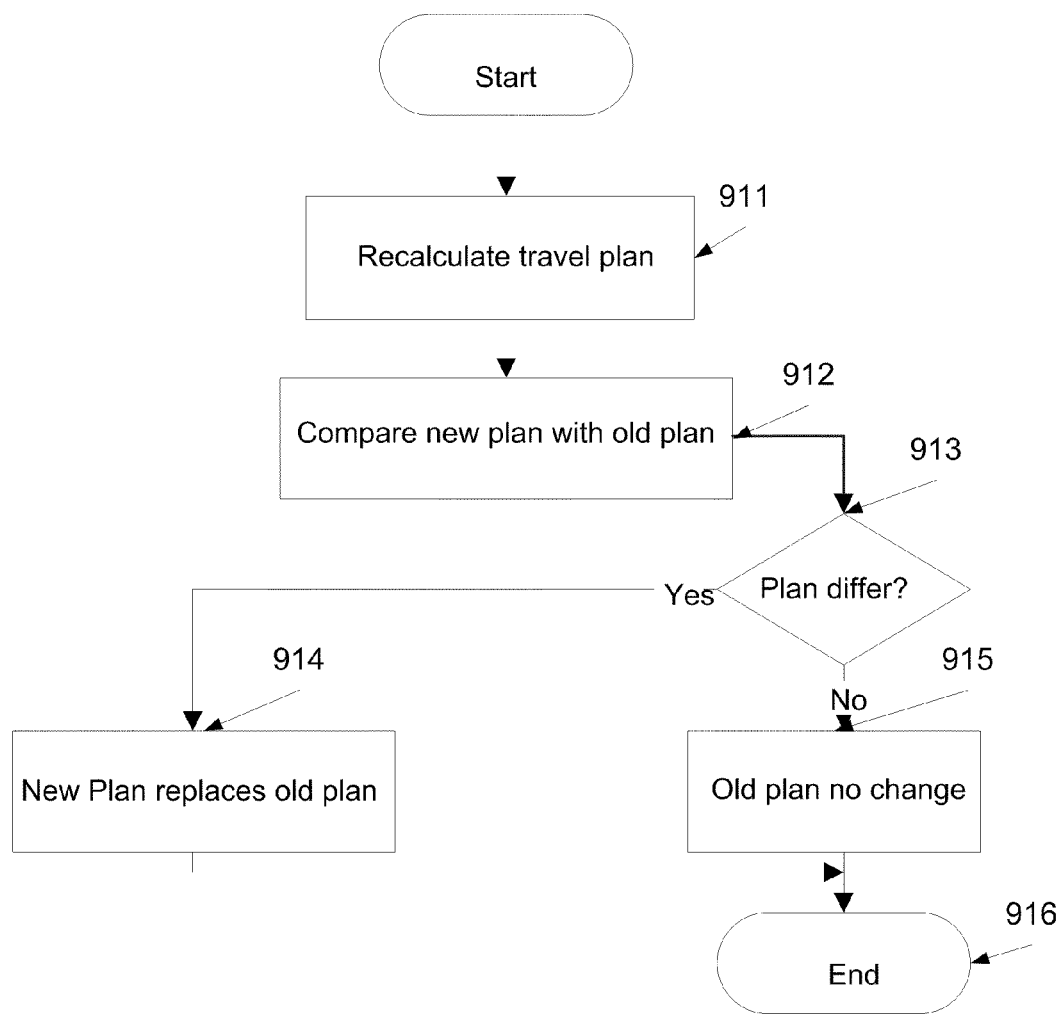
FIG. 11 is a process in which an updated travel plan is created and suggested to the user and/or replacing the current travel plan automatically, according to some embodiments of the present invention.

FIG. 11 depicts a process in which an updated travel plan is created and suggested to the user and/or replacing the current travel plan automatically. As shown at 911, a new plan is recalculated, for example in response to the selection a new travel object and/or update of a selected travel object, for example as described above. If differences are detected, as shown at 913, the new travel plan replaces the old one. Else, no change is performed. Optionally, the new plan is presented to the user. In such an embodiment, the replace will occur only if the user confirms the new plan. Clearly a number of travel plans may be presented to the user.

Figure 12:
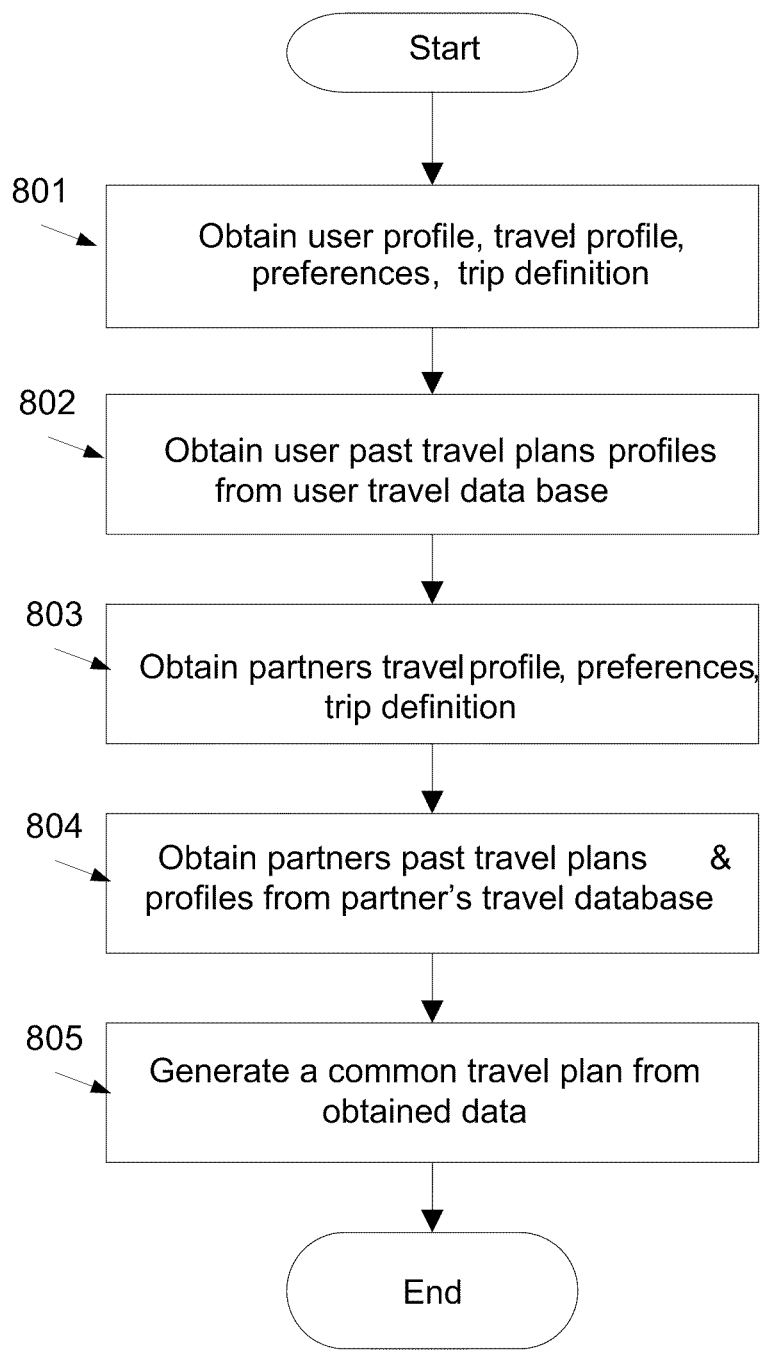
FIG. 12 is an exemplary method of performing a multi participant planning, according to some embodiments of the present invention.

According to some embodiments of the present invention, there is provided system and method of planning a travel plan for a plurality of travelers. In such an embodiment, the travel objects, which are provided at the suggested group of travel objects, are selected according the user profiles of the travelers. In such an embodiment, a user may select user profiles of a group of travelers he wants to travel with and/or input their user data. Then, travel objects are selected and optionally weighted according to a match with the characteristics defined in the user profiles. Optionally, the higher is the number of user profiles that match with a certain travel object, the higher is its weight. FIG. 12 depicts an exemplary method of performing such planning. As shown at 801, 802, user profile and related travel profile are provided, for example similarly to the described above. Then, as shown at 803, 804, respective data of partners is gathered. This allows, as shown at 805, generating a common travel plan in which the characteristics of each participate is taken into account.

As described above, the travel plans are updated as long as the travel does not end. According to some embodiments of the present invention, the execution of the travel object is monitored and optionally recorded in real time. In such embodiments the user confirms each travel object which has been executed, facilitating the creation of executed travel plans. Additionally or alternatively, the execution of travel objects is automatically confirmed. Optionally, the client device 106 is a handheld device, such as a mobile phone and a laptop, which is connected to a global positioning system (GPS) module, geographic information system (GIS) module or any other location sensitive module, such as a location service of a cellular network. By matching between the coordinates of the user and the coordinates of the travel objects, at the time the travel objects are scheduled, an automatic confirmation of the execution of the travel objects may be acquired. Manual confirmation may be acquired by presenting a GUI that allows the user to confirm execution. Optionally, the user in requested to score his satisfaction from the activity of the respective travel object. For example, the user is presented with one or more scales each of between 1 and 10. The user may use the scales to score his enjoyment from the activity and/or from specific parameters, such service, view, experience and/or cleansing. Optionally, the executed travel plans and/or the scores are optionally stored in the user profile so as to assist in the generation of future travel plans. The executed travel plans and/or the scores may be used to estimate the preferences of the user and/or to weight travel objects which have already been visited by the user. Optionally, the scoring is used for weighting travel objects for other users, for example as described above.

Optionally, each travel object receives a users' score according to the scoring it received by different users.

Optionally, the system 100 includes a similarity module set to identify travel objects which have been highly scored by the same users. Optionally, when a user selects a certain travel object which have been highly scored by a group of other users, the similarity module is used for suggesting him with travel objects which have been highly scored by the same group of other users, for example under the title: "users who liked this activity also liked the following travel activities".

Optionally, travel objects which are suggested to the user are presented with a tag indicating whether other users performed the related travel activity and optionally the score they gave it. Optionally, the travel objects which are suggested to the user are presented with a tag indicating whether users which are friends of the user, for example in a social network, such as Facebook™ and Linkedin™, performed the related travel activity and optionally the score they gave it.

It is expected that during the life of a patent maturing from this application many relevant systems and methods will be developed and the scope of the term module, repository, and record is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method of planning a trip, comprising:
receiving a plurality of touristic interests from a user;
automatically arranging a selected group from a plurality of tourist activities wherein each member of said selected group is associated with a geographical site and a plurality of scheduling characteristics, wherein said members are selected automatically according to said plurality of touristic interests, said geographical site and said plurality of scheduling characteristics, and wherein said automatic arranging produces a time sequence and a geographical site sequence for a touristic activity plan of said user;
monitoring at least one network node to detect automatically an update to at least one of said plurality of touristic activities;
automatically rearranging a new selected group from said plurality of touristic activities in response to receiving said update to produce a new time sequence and a new geographical site sequence of said touristic activity plan, wherein said new selected group comprises a plurality of rearrangements of said new selected group members in a new touristic activity plan; and
presenting a notification indicative of said new time sequence and said new geographical site sequence to said user.

2. The method of claim 1, wherein said update is an update to an arrangement of said touristic activity plan, said update being received from said user.

3. The method of claim 1, wherein said updating comprises detecting an execution of one member of said selected group and automatically adding another of said plurality of tourist activities in response to said detection.

4. The method of claim 1, wherein said automatically selecting comprises adding at least one additional tourist activity in response to a selection of a tourist activity having an execution of another said tourist activity as a suspending condition.

5. The method of claim 1, wherein at least some of said plurality of touristic interests are extracted from a user profile of said user.

6. The method of claim 1, wherein at least some of said plurality of touristic interests are extracted from a travel profile provided by said user to define at least one of a group consisting of: hobbies, pastimes, leisure interests, professional interests, entertainment interests, destination, travel period, origin, attendants, and type.

7. The method of claim 6, further comprising updating said user profile according to said plurality of tourist activities.

8. The method of claim 1, further comprising identifying at least one additional user profile associated with a user profile of said user, each said additional user profile defined at least one executed travel schedule defining at least one executed tourist activity; wherein said automatically selecting comprises automatically selecting said new selected group according to said at least one executed tourist activity.

9. The method of claim 1, further comprising receiving a plurality of additional touristic interests from at least one additional user, said arranging and said rearranging comprises computing at least one member of said arrangement and said updated arrangement so that each of said members is scheduled according to a relationship between its scheduling characteristics, said geographical site, said touristic interests and said plurality of additional touristic interests.

10. The method of claim 1, wherein said automatically selecting comprises weighting at least some of said plurality of tourist activities according to a user profile of said user and selecting said selected group and said new selected group according to said weighting.

11. The method of claim 1, wherein said automatically selecting comprises analyzing a popularity of at least some of said plurality of tourist activities in at least one online content source and selecting said selected group and said selected new group according to said analysis.

12. The method of claim 1, wherein said automatically selecting comprises analyzing said plurality of touristic interests and automatically selecting said selected group and said new selected group according to said analyzing.

13. The method of claim 1, wherein said plurality of scheduling characteristics comprise a location of an activity site, said arranging and said rearranging comprises computing said arrangement according to a distance between said location and at least one other location of at least one additional activity site defined by at least one of said plurality of other tourist activities.

14. The method of claim 13, wherein said arranging and said rearranging comprises computing said arrangement according to a transportation parameter pertaining to a route between said activity site and said at least one additional activity site.

15. The method of claim 1, further comprising displaying said arrangement to a user.

16. The method of claim 1, wherein said arranging and said rearranging comprises receiving at least one user profile of at least one additional user and computing said arrangement according to said at least one user profile.

17. The method of claim 1, wherein at least one of said plurality of tourist activities is a suspending condition, said suspending conditions is a condition that when fulfilled causes a tourist activity to become valid.

18. The method of claim 1, wherein each of said plurality of tourist activities is arranged in a distinct cluster according to said tourist activity type.

19. The method of claim 1, wherein each of said scheduling characteristics is selected from a group consisting at least one of: availability period, age classification, geographic location, tourist activity span, description media content, booking period, booking details, suspending conditions, context relation to other tourist activities, cost, weather requirement, cultural relevancy and social relevancy.

20. The method of claim 1, wherein said new selected group comprises a modified travel activities selected from members of said selected group.

21. A computerized system of managing a travel plan, comprising:
   a processor;
   a memory coupled to said processor;
   a database hosting, using said processor, a plurality of tourist activities, each having a geographical site and a plurality of scheduling characteristics;
   an input interface which receives a plurality of touristic interests from a user via a network; and
   a travel planning manager which automatically selects a selected group of said plurality of tourist activities according to said plurality of touristic interests, said geographical site and said plurality of scheduling characteristics and computes, using said processor, an arrangement of members of said selected group in a time sequence and a geographical site sequence for a touristic activity plan of said user;
   an updating module which automatically identifies an update to at least one of said plurality of tourist activities by monitoring at least one network node connected to said network;
   wherein said travel planning manager receives said update and automatically updates said arrangement by automatically rearranging a new selected group from said plurality of touristic activities in response to receiving said update to produce a new time sequence and a new geographical site sequence of said touristic activity plan, wherein said new selected group comprises a plurality of rearrangements of said new selected group members; and
      presenting a notification indicative of said new time sequence and said new geographical site sequence to said user.

22. The system of claim 21, further comprising a reservation module which communicates with at least one network node connected to said network to reserve automatically at least one service according to said arrangement.

23. The system of claim 21, further comprising a data analysis module which scores at least some of said plurality of tourist activities according to a content published by at least one network node connected to said network.

24. The system of claim 21, further comprising a similarity module which scores at least some of said plurality of tourist activities according to a similarity to at least one tourist activity, previously selected by said user, of said plurality of tourist activities.

25. The system of claim 21, further comprising a location sensitive module which identifies a location of said user, said travel planning manager updates said arrangement according to said location.

26. The system of claim 21, wherein said updating module monitors an addition of at least one new tourist activity to said database and calculates said update accordingly.

27. The system of claim 21, wherein said updating module monitors at least one network node connected to said network to detect a change to at least one of said plurality of tourist activities, said updating module updating said at least one tourist activity according to said change.

28. A computer program product, comprising a non-transitory computer usable storage medium having a computer readable program code embodied in said medium for planning a trip, said computer readable program code, comprising:

receiving a plurality of tourist interests from a user;

automatically arranging a selected group from a plurality of tourist activities wherein each member of said selected group is associated with a geographical site and a plurality of scheduling characteristics, wherein said members are selected automatically according to said plurality of touristic interests, said geographical site and said plurality of scheduling characteristics, and wherein said automatic arranging produces a time sequence and a geographical site sequence for a touristic activity plan of said user;

monitoring at least one network node to detect automatically an update to at least one of said plurality of scheduling characteristics of at least one of said plurality of tourist activities; and automatically rearranging a new selected group from said plurality of touristic activities in response to receiving said update to produce a new time sequence and a new geographical site sequence of said touristic activity plan, wherein said new selected group comprises a plurality of rearrangements of said new selected group members; and presenting a notification indicative of said new time sequence and said new geographical site sequence to said user.

* * * * *